United States Patent
Kitagata

(10) Patent No.: US 8,842,320 B2
(45) Date of Patent: Sep. 23, 2014

(54) PRINT RELAY SYSTEM, CONTROL METHOD, AND STORAGE MEDIUM

(75) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/613,409

(22) Filed: Sep. 13, 2012

(65) Prior Publication Data

US 2013/0077125 A1 Mar. 28, 2013

(30) Foreign Application Priority Data

Sep. 27, 2011 (JP) ................................. 2011-210396

(51) Int. Cl.
*G06K 17/00* (2006.01)
*G06F 3/12* (2006.01)

(52) U.S. Cl.
CPC .................................... *G06F 3/1253* (2013.01)
USPC ........................... 358/1.15; 358/1.14; 710/100

(58) Field of Classification Search
None
See application file for complete search history.

(56) References Cited

U.S. PATENT DOCUMENTS

| 7,574,545 B2 | 8/2009 | Keeney et al. | |
| 2005/0005047 A1* | 1/2005 | Keeney et al. | ................ 710/100 |

FOREIGN PATENT DOCUMENTS

JP 2003-196054 A 7/2003

* cited by examiner

*Primary Examiner* — Steven Kau
*Assistant Examiner* — Andrew H Lam
(74) *Attorney, Agent, or Firm* — CANON USA Inc. IP Division

(57) ABSTRACT

A print relay system includes a confirmation unit configured to check, in response to reception of a print instruction from a user apparatus, whether print information associated with second printer information that corresponds to a user who operates the user apparatus, of the second printer information included in printer management information, has been received from the print service, or whether a print job has been generated based on the print information. The print relay system further includes a transmission unit configured to transmit, in response to the confirmation unit confirming that the print job has been generated based on the print information associated with the second printer information that corresponds to the user, information including location information of the print job via the user apparatus to the image forming apparatus that executes the generated print job.

5 Claims, 16 Drawing Sheets

FIG.8A

| ServiceName |
|---|
| Print Service A |
| Print Service B |

FIG.8B

| 801 | 802 | 803 | 804 | 805 | 806 | 807 | 808 | 809 | 810 | 811 |
|---|---|---|---|---|---|---|---|---|---|---|
| PRINT RELAY SERVICE User ID | Virtual Printer ID | Service Name | Real Printer ID | Printer Kind | Service Printer ID | Printer Name | Capabilities | IP address | status | Job ID |
| UserA | VPBCH-8EA1CB19-5D9E | Print Service A | RP-E2B53416-B536 | AAA | SP-5D15DEAF-BE3C | Printer 1 | ..... | 192.168.0.1 | notified | — |
| UserA | VPBCH-94E1E881-BEFA | Print Service A | RP-E5BF5531-CAF9 | AAB | SP-2336ACD3-4D27 | Printer 2 | ..... | 192.168.0.5 | — | — |
| UserB | VPBCH-D24B4912-2866 | Print Service B | RP-677F2761-B68D | AAC | SP-1AE5A901-3D8C | Printer 3 | ..... | 172.20.0.4 | — | — |
| UserB | VPBCH-40BDE35B-A6D4 | Print Service A | RP-E5BF5531-CAF9 | AAB | SP-F5C17CC0-1877 | Printer 4 | ..... | 192.168.0.5 | got | XXYYZZ |
| UserB | VPBCH-A4DB3F7A-0123 | Print Service B | RP-DE0E88F6-6115 | AAE | SP-4120C0A0-99A3 | Printer 5 | ..... | 192.168.5.1 | — | — |

FIG.8C

| 812 | 813 | 814 | 815 | 816 |
|---|---|---|---|---|
| PRINT SERVICE User ID | Service Printer ID | Name | Capabilities | Virtual Printer ID |
| UserA@XXX.com | SP-5D15DEAF-BE3C | Printer 1 | ..... | VPBCH-8EA1CB19-5D9E |
| UserA@XXX.com | SP-2336ACD3-4D27 | Printer 2 | ..... | VPBCH-94E1E881-BEFA |
| UserB@XXX.com | SP-1AE5A901-3D8C | Printer 3 | ..... | VPBCH-D24B4912-2866 |
| UserB@XXX.com | SP-F5C17CC0-1877 | Printer 4 | ..... | VPBCH-40BDE35B-A6D4 |
| UserB@XXX.com | SP-4120C0A0-99A3 | Printer 5 | ..... | VPBCH-A4DB3F7A-0123 |

FIG.9A1

| 801 | 802 | 809 | 810 | 811 |
|---|---|---|---|---|
| PRINT RELAY SERVICE User ID | Virtual Printer ID | IP address | status | Job ID |
| UserB | VPBCH-D24B4912-2866 | 172.20.0.4 | — | — |
| | VPBCH-40BDE35B-A6D4 | 192.168.0.5 | — | — |
| | VPBCH-A4DB3F7A-0123 | 192.168.5.1 | — | — |

FIG.9A2

| 801 | 802 | 809 | 810 | 811 |
|---|---|---|---|---|
| PRINT RELAY SERVICE User ID | Virtual Printer ID | IP address | status | Job ID |
| UserB | VPBCH-D24B4912-2866 | 172.20.0.4 | — | — |
| | VPBCH-40BDE35B-A6D4 | 192.168.0.5 | notified | — |
| | VPBCH-A4DB3F7A-0123 | 192.168.5.1 | — | — |

FIG.9A3

| 801 | 802 | 809 | 810 | 811 |
|---|---|---|---|---|
| PRINT RELAY SERVICE User ID | Virtual Printer ID | IP address | status | Job ID |
| UserB | VPBCH-D24B4912-2866 | 172.20.0.4 | — | — |
| | VPBCH-40BDE35B-A6D4 | 192.168.0.5 | got | — |
| | VPBCH-A4DB3F7A-0123 | 192.168.5.1 | — | — |

FIG.9A4

| 801 | 802 | 809 | 810 | 811 |
|---|---|---|---|---|
| PRINT RELAY SERVICE User ID | Virtual Printer ID | IP address | status | Job ID |
| UserB | VPBCH-D24B4912-2866 | 172.20.0.4 | — | — |
| | VPBCH-40BDE35B-A6D4 | 192.168.0.5 | got | XXYYZZ |
| | VPBCH-A4DB3F7A-0123 | 192.168.5.1 | — | — |

FIG.9B

| 801 | 802 | 803 | 804 | 805 | 806 | 807 | 808 | 809 | 810 | 811 | 811' |
|---|---|---|---|---|---|---|---|---|---|---|---|
| PRINT RELAY SERVICE User ID | Virtual Printer ID | Service Name | Real Printer ID | Printer Kind | Service Printer ID | Printer Name | Capabilities | IP address | status | Job ID | Job ID |
| UserA | VPBCH-8EA1CB19-5D9E | Print Service A | RP-E2B53416-B536 | AAA | SP-5D15DEAF-BE3C | Printer 1 | ..... | 192.168.0.1 | notified | — | — |
| | VPBCH-94E1E881-BEFA | Print Service A | RP-E5BF5531-CAF9 | AAB | SP-2336ACD3-4D27 | Printer 2 | ..... | 192.168.0.5 | — | — | — |
| UserB | VPBCH-D24B4912-2866 | Print Service B | RP-677F2761-B68D | AAC | SP-1AE5A901-3D8C | Printer 3 | ..... | 172.20.0.4 | — | — | — |
| | VPBCH-40BDE35B-A6D4 | Print Service A | RP-E5BF5531-CAF9 | AAB | SP-F5C17CC0-1877 | Printer 4 | ..... | 192.168.0.5 | got | XXYYZZ | CCDDEE |
| | VPBCH-A4DB3F7A-0123 | Print Service B | RP-DE0E88F6-6115 | AAE | SP-4120C0A0-99A3 | Printer 5 | ..... | 192.168.5.1 | — | — | — |

FIG.11A

```
<Capabilities>
  <Duplex>
    <Item>1-Side</Item>
    <Item>2-Side</Item>
  </Duplex>
  <Color>
    <Item>mono</Item>
    <Item>color</Item>
  </Color>
  <PaperSize>
    <Item>B5</Item>
    <Item>A4</Item>
    <Item>A3</Item>
  </PaperSize>
</Capabilities>
```

FIG.11B

```
<PrintSettings>
  <Duplex>
    <Item>2-Side</Item>
  </Duplex>
  <Color>
    <Item>mono</Item>
  </Color>
  <PaperSize>
    <Item>A4</Item>
  </PaperSize>
</PrintSettings>
```

FIG.11C

```
<PrintJob>
  <id>
    <Item>5846759561318635695</Item>
  </id>
  <title>
    <Item>Doc1</Item>
  </title>
  <status>
    <Item>QUEUED</Item>
  </status>
  <dataUrl>                                              /—1701
    <Item>http://prt.srv.com/data/5846759561318635695</Item>
  </dataUrl>
  <settingUrl>                                           /—1702
    <Item>http://prt.srv.com/setting/5846759561318635695</Item>
  </settingUrl>
  <printerid>
    <Item>SP-F5C17CC0-1877</Item> —1703
  </printerid>
</PrintJob>
```

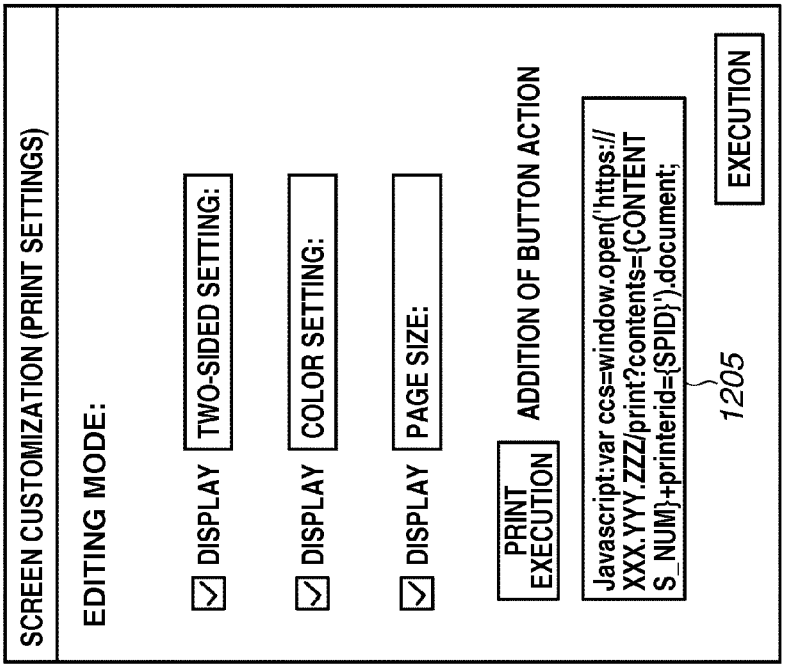
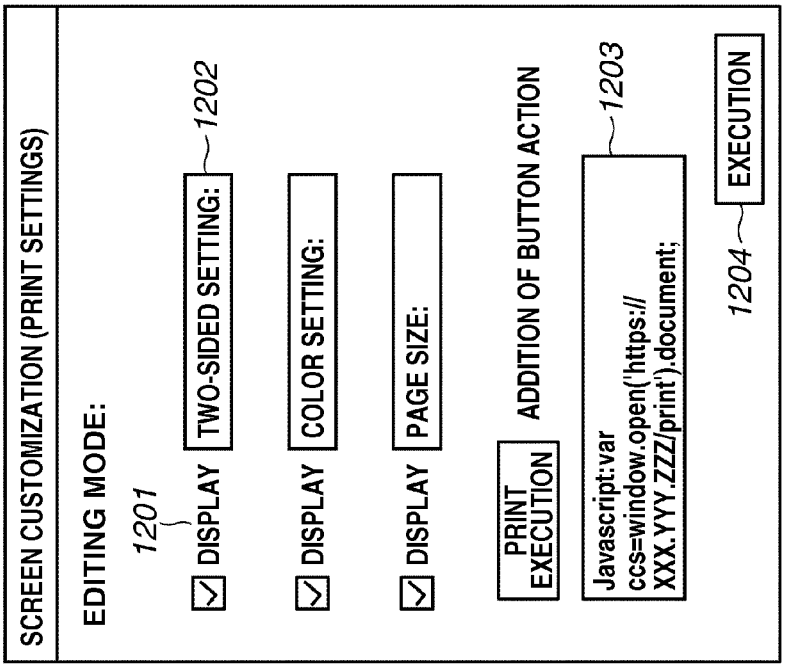

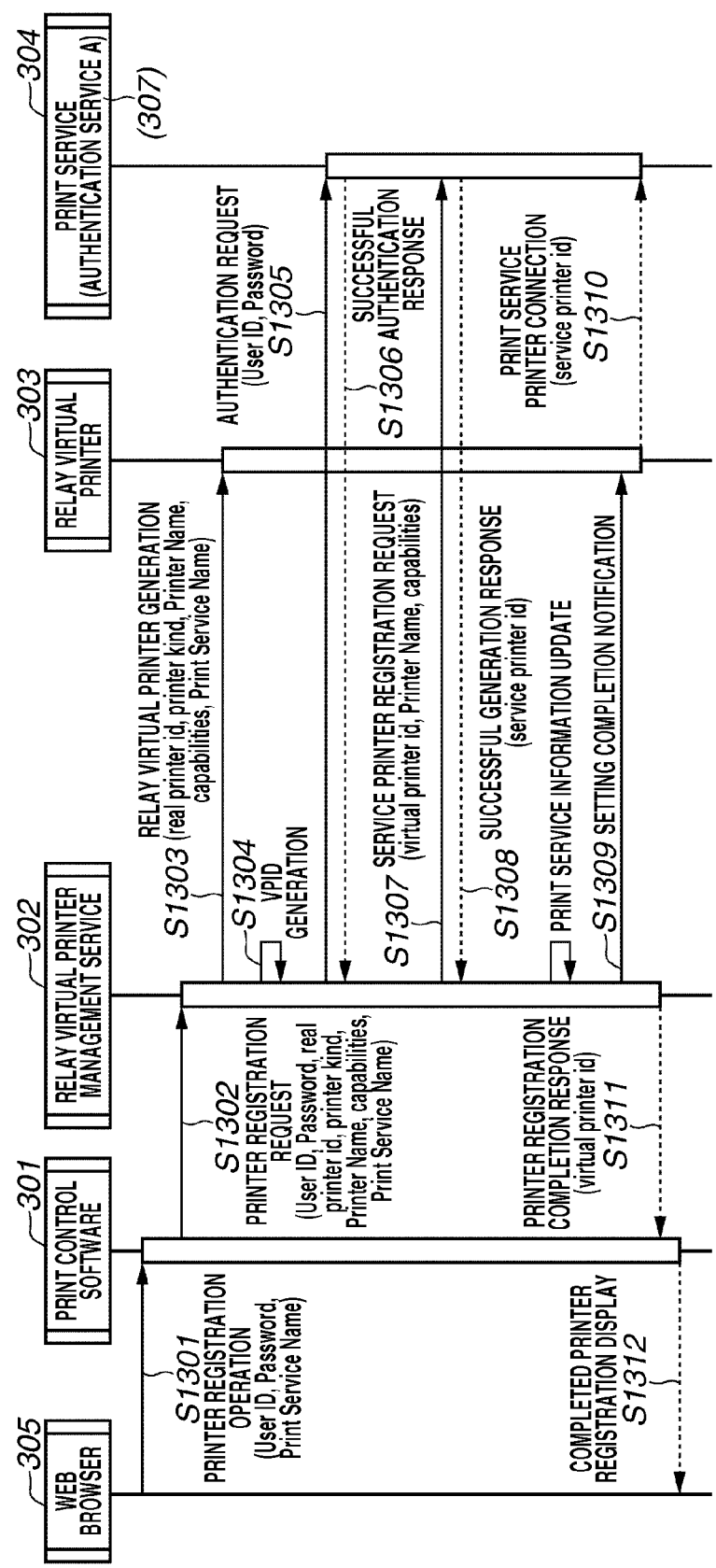

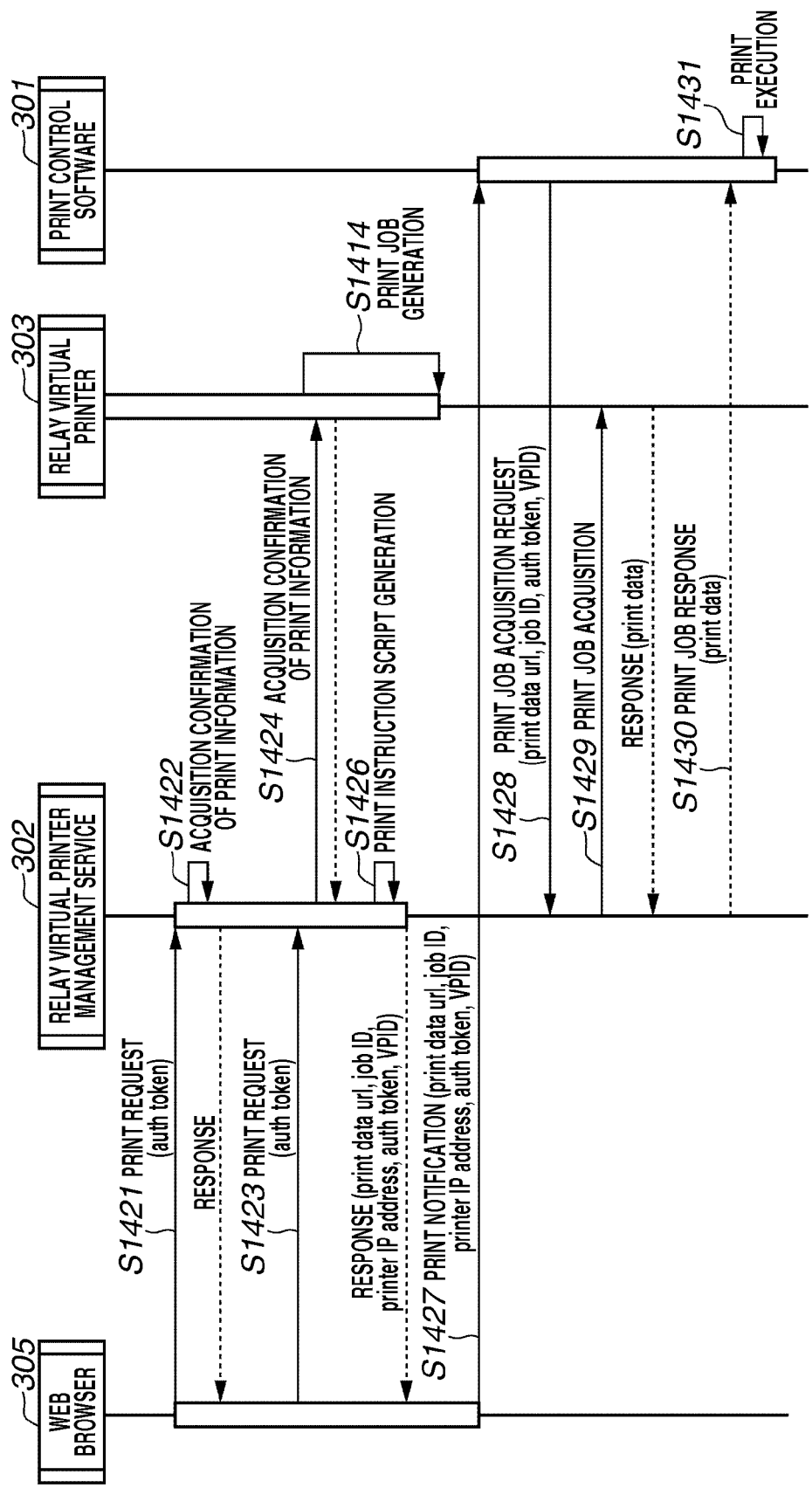

PRINT RELAY SYSTEM, CONTROL METHOD, AND STORAGE MEDIUM

BACKGROUND OF THE INVENTION

1. Field of the Invention

The claimed invention generally relates to printing and, more particularly, to a print relay system, a control method, and a storage medium.

2. Description of the Related Art

A printing system that enables a client to transmit a print instruction to a web server and causes the server to convert a target print content into print data in response to the received print instruction is conventionally known.

According to a conventional method discussed in Japanese Patent Application Laid-Open No. 2003-196054, a web server receives a print instruction and print control information from a client and the web server generates print data based on the print control information. The web server discussed in Japanese Patent Application Laid-Open No. 2003-196054 can provide a print data generation service to the client.

As described above, it is conventionally known that a web server can provide a service to a client. The cloud computing is a recently featured system that includes a web server capable of providing a service to a client. The cloud computing is mainly characterized by simultaneously processing requests from many clients using many computing resources to discretely execute data conversion and data processing. At present, many vendors are available for computer users who use web services installed on cloud computing environments that can realize such a cloud computing system capable of providing various types of services.

Google (registered trademark) is one of the noteworthy vendors that can provide numerous services on the cloud computing environments. Google has many large-scale data centers and proposes a variety of services (including print service) based on association with other devices. Google has developed an infrastructure for data communications between devices and services. For example, Google has developed a data communication infrastructure that can provide various services in association with an image forming apparatus. The interface via which an image forming apparatus can perform data communications in the cloud computing environments prepared by Google is currently opened to the public. If the above-described interface is installed on an image forming apparatus, it is unnecessary to install a printer driver on a client, similar to the method discussed in Japanese Patent Application Laid-Open No. 2003-196054.

The service that generates print data according to a print instruction from a client, i.e., a user apparatus operated by a user, is referred to as a print service. Such a service can be provided by Google. Further, a server that acquires print data from a print service and transmits the acquired print data to an image forming apparatus is referred to as a print relay system. In a printing system in which the print service is associated with the print relay system, an image forming apparatus in the intranet acquires print data across a firewall from the print relay system on the Internet or other computer network and performs printing based on the acquired print data. Therefore, a pull-type printing environment can be obtained.

As discussed in U.S. Pat. No. 7,574,545 B2, there is a conventional print technique applicable to a user apparatus, a print relay system, and an image forming apparatus to realize print processing therebetween across a firewall. According to the print technique discussed in U.S. Pat. No. 7,574,545 B2, the print relay system can instruct the image forming apparatus to perform printing based on polling from the image forming apparatus to the print relay system.

However, frequently performed polling from an image forming apparatus to a print relay system may increase the load of the print relay system. Hence, a printing system that enables each user to transmit a print instruction to an image forming apparatus via a browser installed on a user apparatus is employable. According to such a printing system, a user can send a print instruction to a print service and can send a notification including user information of the user who is communicating with the print service and print data to an image forming apparatus. Thus, the image forming apparatus can acquire print data from the print service via the print relay system at appropriate timing. As a result, it is feasible to reduce the load of the polling based print relay system.

However, sending user information and print data from a user apparatus to an image forming apparatus is troublesome for a user. For example, the following problem may arise in a printing system in which the print service manages the usage of each user for a single image forming apparatus and the print relay system manages the usage of a plurality of users for a single image forming apparatus. More specifically, each user notifies the image forming apparatus of a user whose usage is managed by the print service each time the printing is performed. When the user instruction is sent to the image forming apparatus, the print relay system can acquire print data that corresponds to the user who has instructed the printing and the image forming apparatus with which the user wants to perform printing from the print service and can transmit the acquired print data to the image forming apparatus.

SUMMARY OF THE INVENTION

The claimed invention is directed to a print relay system that acquires print data that corresponds to a print instructing user and an image forming apparatus that performs print processing according to the user instruction from a print service, without increasing the burden of the user, and transmits the acquired print data to the image forming apparatus.

According to an aspect of the claimed invention, a print relay system is configured to communicate, via a network, with a user apparatus, a print service configured to generate print information including print data and print settings according to a print instruction from the user apparatus, and an image forming apparatus configured to execute a print job according to the print instruction. The print relay system includes a management unit configured to store, in a storage unit, and manage printer management information, in which the user apparatus operated by a user, first printer information corresponding to the image forming apparatus that executes a print job according to a print instruction from the user apparatus managed by the print relay system, and second printer information corresponding to the image forming apparatus managed by the print service are associated with one another. The print relay system further includes a reception unit configured to receive the print information from the print service, and a generation unit configured to generate a print job based on the print data and the print settings included in the received print information. The print relay system further includes a confirmation unit configured to check, in response to reception of the print instruction from the user apparatus, whether print information associated with the second printer information that corresponds to the user who operates the user apparatus, of the second printer information included in the printer management information, has been received from the print service, or whether a print job has been generated based on the print information. The print relay system further includes a transmission unit configured to transmit, in response to the confirmation unit confirming that the print job has been generated based on the print information associated with the second printer information that corresponds to the user, information including location information of the print job via the user apparatus to the image forming apparatus that executes the generated print job.

Further features and aspects of the claimed invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

FIGS. 8A, 8B, and 8C illustrate example information that can be stored by a print service, a user information management unit, and a printer information storing unit, respectively.

FIGS. 9A1, 9A2, 9A3, 9A4, and 9B illustrate example information that can be stored in the user information management unit.

FIGS. 11A, 11B, and 11C illustrate example eXtensible Markup Language (XML) formats that express capabilities, print settings, and notification information, respectively.

FIGS. 13A, 13B, and 13C illustrate examples of an example script registered in a bookmark and screen customization.

FIG. 14 is a sequence diagram illustrating example processing for registering a relay virtual printer in a print service according to an example embodiment of the claimed invention.

FIG. 16 is a sequence diagram illustrating the latter part of the processing illustrated in FIG. 15.

DESCRIPTION OF THE EMBODIMENTS

Various exemplary embodiments, features, and aspects of the claimed invention will be described in detail below with reference to the drawings.

Figure 1:
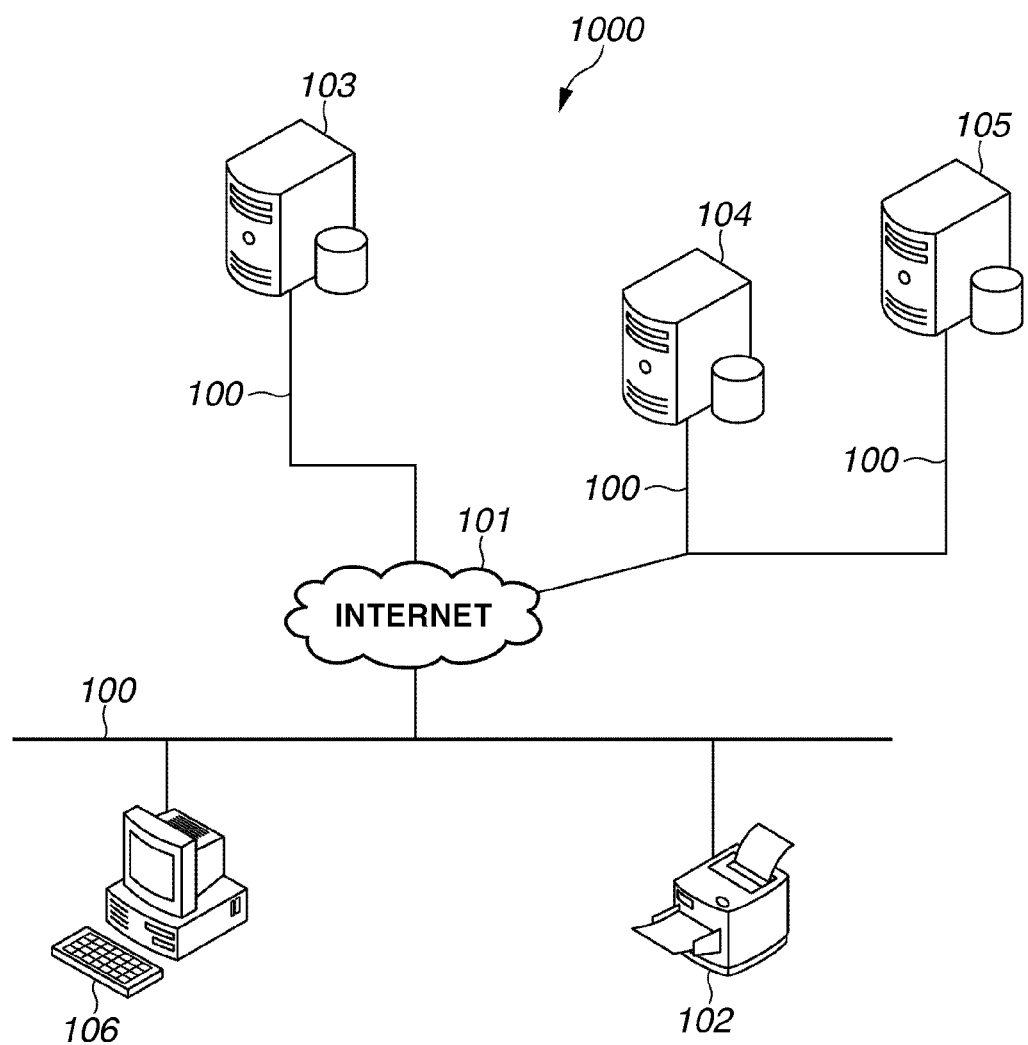
FIG. 1 illustrates an example configuration of a printing system according to a first exemplary embodiment of the claimed invention.

FIG. 1 illustrates an example system configuration according to a first exemplary embodiment of the claimed invention. The printing system 1000 according to the first exemplary embodiment includes a client computer 106 and an image forming apparatus 102. The client computer 106 and the image forming apparatus 102 are apparatuses located in a user environment and are connected with each other via a network 100. The network 100 is connected to a computer network illustrated as the Internet 101. However, the network 100 may be connected to any computer network configuration.

The printing system 1000 further includes a web application server group 105 and a print server group 104. Each of the web application server group 105 and the print server group 104 is a server group that can be provided by the same vendor.

Further, the web application server group 105 and the print server group 104 are mutually connected via the network 100. The network 100 is connected to the Internet 101 so that the above-described apparatuses can communicate with each other via the Internet 101. In the first exemplary embodiment, two server groups are connected via the network 100, although they can be connected via the Internet 101.

Further, the printing system 1000 includes a print relay server 103, which is operable as a print relay system. The print relay server 103 is connected to the network 100. The network 100 is connected to the Internet 101. Respective apparatuses and server groups that constitute the printing system 1000 are connectable to each other and can perform data communications via the Internet 101. Each apparatus is not limited to a single apparatus as illustrated in FIG. 1 and can be constituted by a plurality of devices. Further, each server group can be constituted by a single device. In the present exemplary embodiment, the print relay server is referred to as a single server regardless of the number of actual devices that constitute the server. Each of the print server group 104 and the web application server group 105 is composed of a plurality of devices.

The web application server group 105 can provide a web service to generate content data to each client. The web application server group 105 can store content data generated by the client using the provided web service. The print server group 104 can provide print data generated based on the content data stored in the web application server group 105 to a transmission destination. The image forming apparatus 102 includes a printing unit configured to perform printing based on print data. The print relay server 103 can acquire print data to be provided to a transmission destination from the print server group 104 or the web application server group 105.

Figure 2:
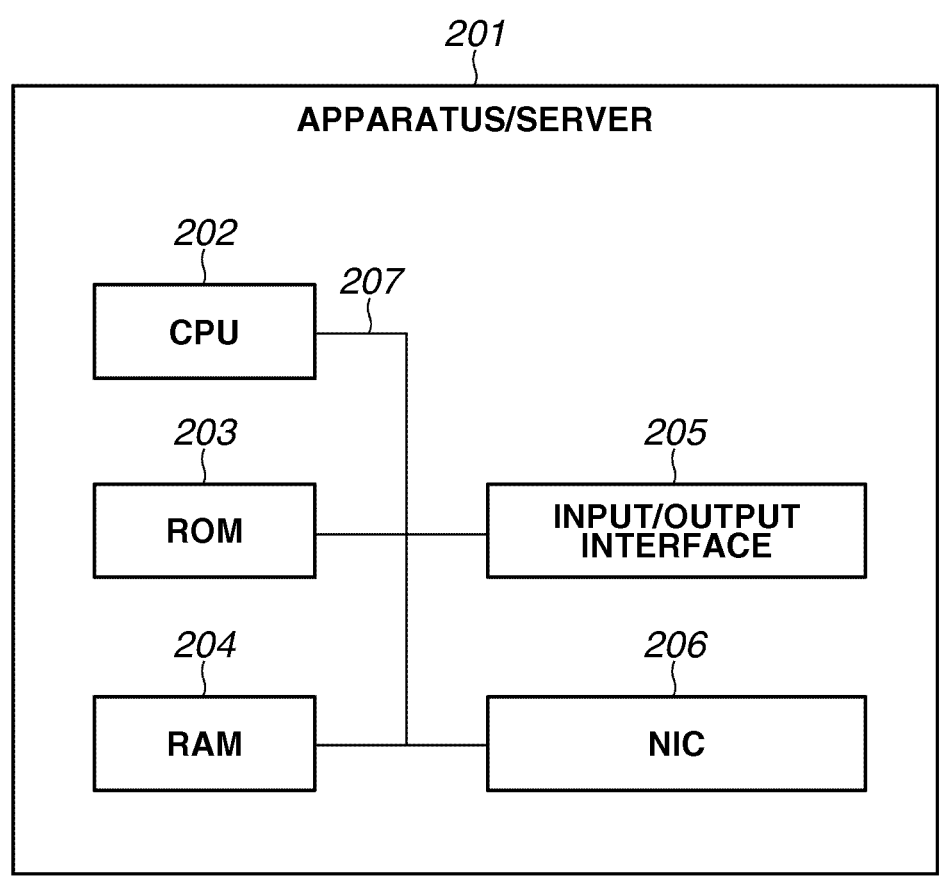
FIG. 2 illustrates an example hardware configuration applicable to each apparatus or server group that constitutes the printing system according to the first exemplary embodiment.

FIG. 2 illustrates a hardware configuration of a device or a server group that constitutes the printing system 1000. A central processing unit (CPU) 202 is a functional unit configured to execute various programs and realize various functions. A read only memory (ROM) 203 is a functional unit configured to store various programs. A random access memory (RAM) 204 is a storage unit functionally operable as a temporary work storage area for the CPU 202. The CPU 202 can execute each program loaded from the ROM 203 into the RAM 204. An input/output interface 205 can transmit data to a display device (not illustrated) that is connected to each apparatus and each server group.

Further, the input/output interface 205 is an interface unit configured to receive data from a pointing device (not illustrated). A network interface card (NIC) 206 is a unit configured to connect each apparatus and each server group constituting the printing system 1000 to the network 100. The above-described units 202 to 206 can perform data transmission/reception via a bus 207. Further, the image forming apparatus 102 includes a printing unit (not illustrated). The printing unit can transmit and receive data to and from each unit via the bus 207. The printing unit is a unit capable of printing a raster image on a recording medium.

Figure 3:
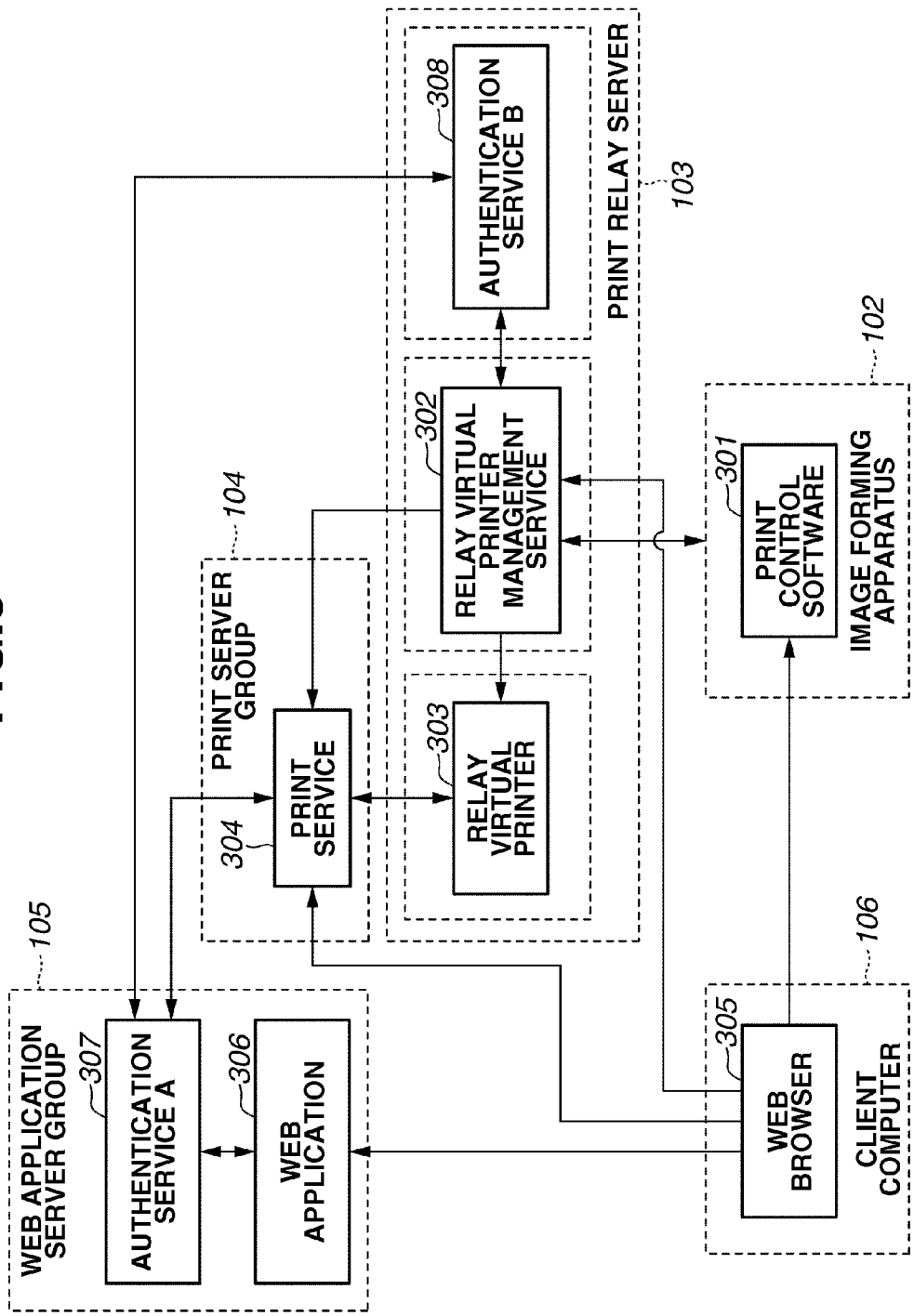
FIG. 3 illustrates an example software configuration applicable to each apparatus or server group that constitutes the printing system according to the first exemplary embodiment.

FIG. 3 is a functional block diagram illustrating each apparatus or server group that constitutes the printing system 1000. A program capable of realizing functions of software illustrated in FIG. 3 is stored in the ROM 203 of each apparatus or each server group. To realize software functions, the CPU 202 executes the program loaded from the RAM 204.

The above-described apparatuses and functions of respective server groups are described in detail below. The functions described in detail below are classified into the following two systems. The functions classified into the first system are functions classified into a registration system that registers the image forming apparatus 102 to the print relay server 103, realizes a relay virtual printer 303 in the print relay server 103, and registers the relay virtual printer 303 to a print service 304.

The function classified into the second system are functions classified into a printing system that causes the print server group 104 to transmit a print instruction of content data generated by the web application server group 105 and causes an image forming apparatus to perform printing based on print data based on a print notification received from the print server group 104. When the system causes the image forming apparatus 102 to perform printing based on print data according to print notification information transmitted from the print server group 104, the print server group 104 transmits the print notification via the print relay server 103 (i.e., an intermediary). Further, the print relay server 103 transmits the print notification to the image forming apparatus 102 via the web browser 305 and causes the image forming apparatus 102 to perform printing according to the print notification.

First, the functions classified into the registration system are described in detail below. The image forming apparatus 102 includes the following functions that are classified into the registration system. The image forming apparatus 102 includes print control software 301. The print control software 301 can realize each function illustrated in FIG. 4. A display unit 401 can display various screens. A print service information storing unit 408 stores print service information. FIG. 8A illustrates examples of the print service information that include a plurality of types of print service information, which includes Print Service A as the print service 304 according to the first exemplary embodiment.

Figure 10A:
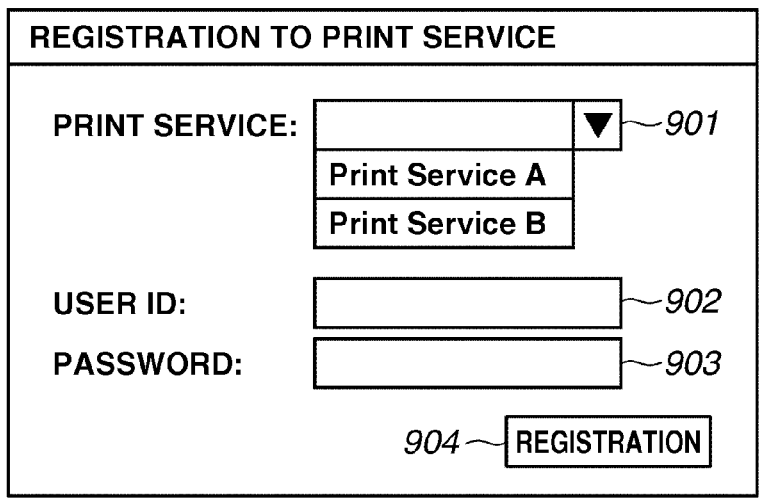
FIGS. 10A and 10B illustrate an example registration user interface (UI) and a print setting screen, respectively.

If a user instructs registering the image forming apparatus 102 to the print service 304, the display unit 401 generates and displays a registration user interface (UI) for the print services illustrated in FIG. 10A based on the information illustrated in FIG. 8A. On the screen illustrated in FIG. 10A, the user selects a print service to be registered from print service 901 displayed on the display unit 401.

In the first exemplary embodiment, the print service 304 is only one available print service. Therefore, the user cannot select any service other than the Print Service A. The user inputs user an identifier (ID) and password that correspond to the selected print service in fields 902 and 903.

Subsequently, the user presses a registration button 904. A registration unit 402 can issue registration information when the user presses the registration button 904. In the first exemplary embodiment, although the available print service is limited to the print service 304, if there is a plurality of selectable print services, the user can set the user ID and password independently for each print service. Further, the registration unit 402 can transmit the issued registration information to a request reception unit 501 included in a relay virtual printer management service 302, which is described below. Other functions are described below.

The registration information is described in detail below. The registration information includes print service name. The print service name is information that can be used to identify a print service selected by a user. More specifically, the relay virtual printer management service 302 can identify the print service 304 of the print server group 104 based on the print service name.

Further, the registration information includes user ID and password. The user ID and the password are information employed to use the print service 304 and the web application server group 105. The user ID and the password are collectively referred to as user identification information. An authentication service A 307 can authenticate the user identification information. Each user can use the print service 304 and the web application server group 105 only when the authentication has been successfully completed. In the present exemplary embodiment, it is presumed that the vendor provides the web application server group 105 and the print server group 104. Therefore, if a user wants to use services that can be provided by respective server groups, the user can use their services with reference to the same user identification information. In the first exemplary embodiment, it is presumed that the user registers the user identification information beforehand in the web application server group 105.

Further, the registration information includes Real Printer ID (RPID) that is unique identification allocated to the image forming apparatus 102 and Internet Protocol (IP) address (or host name) that is employed to connect the image forming apparatus 102 to the network. Each image forming apparatus (not illustrated) including the image forming apparatus 102 has unique identification information having been uniquely allocated. Each image forming apparatus can be identified based on the identification information. Further, the IP address (or the host name) can be used in network communications between the image forming apparatus 102 and the client computer 104 that is present in the same user environment. In the first exemplary embodiment, the setup location of each image forming apparatus can be identified by identifying the RPID. Further, the registration information includes Printer Kind, which represents model information of the image forming apparatus 102.

Further, the registration information includes printer name of the image forming apparatus 102. The printer name is the name allocated to the image forming apparatus 102 and can be used when the image forming apparatus 102 is referred to. The printer name is not identification information. Therefore, the same printer name can be allocated to a plurality of image forming apparatuses.

Further, the registration information includes capabilities. The capabilities are information indicating the capabilities of the image forming apparatus 102. For example, the capabilities include information indicating whether the image forming apparatus 102 can perform two-sided print processing, information indicating whether the image forming apparatus 102 can perform color print processing, and information indicating the size of each paper that can be output by the image forming apparatus 102.

The capabilities represent print functions of the image forming apparatus 102. Further, the capabilities can be transmitted to the request reception unit 501 using an XML format illustrated in FIG. 11A. In FIG. 11A, each <Item> indicates a unique capability of the image forming apparatus 102. According to the example illustrated in FIG. 11A, the image forming apparatus 102 can perform two-sided print processing and can output color print products. Further, the image forming apparatus 102 can use papers of B5 size, A4 size, and A3 size.

Next, the functions of the print relay server 103, which are classified into the registration system, are described in detail below. The print relay server 103 includes the relay virtual printer management service 302.

Figure 5:
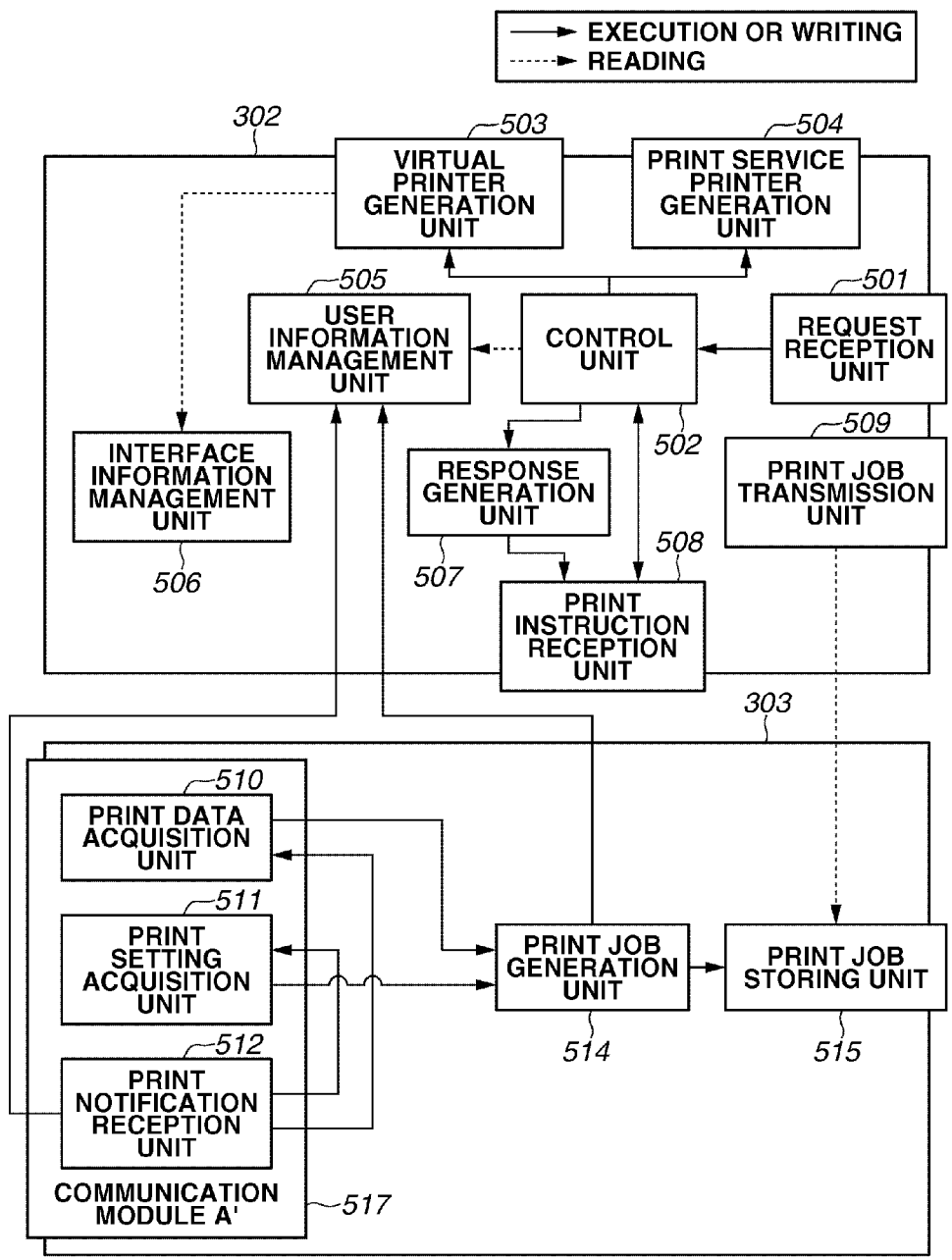
FIG. 5 is a functional block diagram illustrating a relay virtual printer management service and a relay virtual printer according to an exemplary embodiment of the claimed invention.

FIG. 5 is a functional block diagram illustrating the relay virtual printer management service 302 and the relay virtual printer 303. The request reception unit 501 of the relay virtual printer management service 302 can receive registration information. A control unit 502 can acquire the registration information received by the request reception unit 501 and can interpret the registration information. Further, the control unit 502 can output instructions to a virtual printer generation unit 503 and a print service printer generation unit 504 to perform the following two types of processing. The first processing can be performed by the virtual printer generation unit 503 to realize functions of the relay virtual printer 303. The second processing can be performed by the print service printer generation unit 504 to cause the print service 304 to register information relating to the relay virtual printer 303.

The first processing, i.e., the processing to be performed by the virtual printer generation unit 503 to realize the functions of the relay virtual printer 303, is described in detail below. The virtual printer generation unit 503 can identify and acquire a communication module A' 517 stored in an interface information management unit 506, based on the print service name. The communication module A' 517 can communicate with a communication module A 607 included in the print service 304. More specifically, the communication module A' 517 is functionally operable as a reception unit configured to communicate with the print server group 104 and receive print information from the print service 304. The virtual printer generation unit 503 having acquired the communication module can realize a communication module loaded process (thread). The above-described process corresponds to the relay virtual printer 303.

The relay virtual printer 303 is first printer information that corresponds to the image forming apparatus 102 that executes a print job according to a print instruction from the client computer 106, which is managed by the print relay server 103. After the relay virtual printer 303 is realized, the virtual printer generation unit 503 issues Virtual Printer ID (VPID), which is identification information used to identify the realized relay virtual printer 303. The virtual printer generation unit 503 transmits the issued VPID to the control unit 502.

The relay virtual printer 303 can be realized each time the registration information is transmitted from the image forming apparatus 102. VPID (i.e., a unique identifier) is allocated to each realized relay virtual printer 303. In the first exemplary embodiment, a print job notification unit 610 can identify the setup location of the relay virtual printer 303 by identifying the VPID (i.e., relay virtual printer identification information).

Next, the second processing, i.e., the processing that can be performed by the print service printer generation unit 504 to cause the print service 304 to register information relating to the relay virtual printer 303, is described in detail below. The control unit 502 transmits the user identification information to the print service printer generation unit 504. The print service printer generation unit 504 causes the authentication service A 307, via an authentication service B 308, to perform authentication of the print server group 104 based on the received user identification information. The authentication service B 308 is linked with the authentication service A 307 of the web application server group 105 and the print server group 104 through a trust relationship established between them. Therefore, the authentication of the print server group 104 can be performed via the authentication service B 308.

If the authentication has been successfully completed, the print service printer generation unit 504 transmits printer name, capabilities, and VPID to the print service 304. The print service printer generation unit 504 receives, as its response, Service Printer ID (SPID) that represents print service identification information from the print service 304. The SPID is information used to identify the service printer. The service printer is second printer information that corresponds to the image forming apparatus 102 that executes a print job according to a print instruction from the client computer 106, which is managed by the print service 304.

Next, the control unit 502 acquires VPID and SPID from the virtual printer generation unit 503 and the print service printer generation unit 504. Then, the control unit 502 instructs a user information management unit 505 to store the acquired VPID and SPID information. The user information management unit 505 stores VPID, SPID and registration information while associating them with each other as illustrated in FIG. 8B. In the following description, the information stored in user information management unit 505 is referred to as printer management information.

More specifically, the relay virtual printer management service 302 is functionally operable as a management unit or a management apparatus configured to store printer management information including a correspondence relationship between the relay virtual printer 303 and the service printer. The table illustrated in FIG. 8B includes a plurality of fields dedicated to VPID 802, print service name 803, RPID 804, Printer Kind 805, SPID 806, printer name 807, and capabilities 808, respectively.

Next, functions of the print server group 104 classified into the registration system are described in detail below. The print server group 104 includes the print service 304. The print server group 104 is composed of a plurality of servers, which can be regarded as a single virtualized server. The print server group 104 (i.e., the single virtualized server) can realize the functions of the print service 304. The print server group 104 includes a plurality of virtual machines, which can be launched in a single server to realize respective functions of the print service 304. The print service 304 illustrated in FIG. 3 is one of the above-described plurality of servers.

Figure 6:
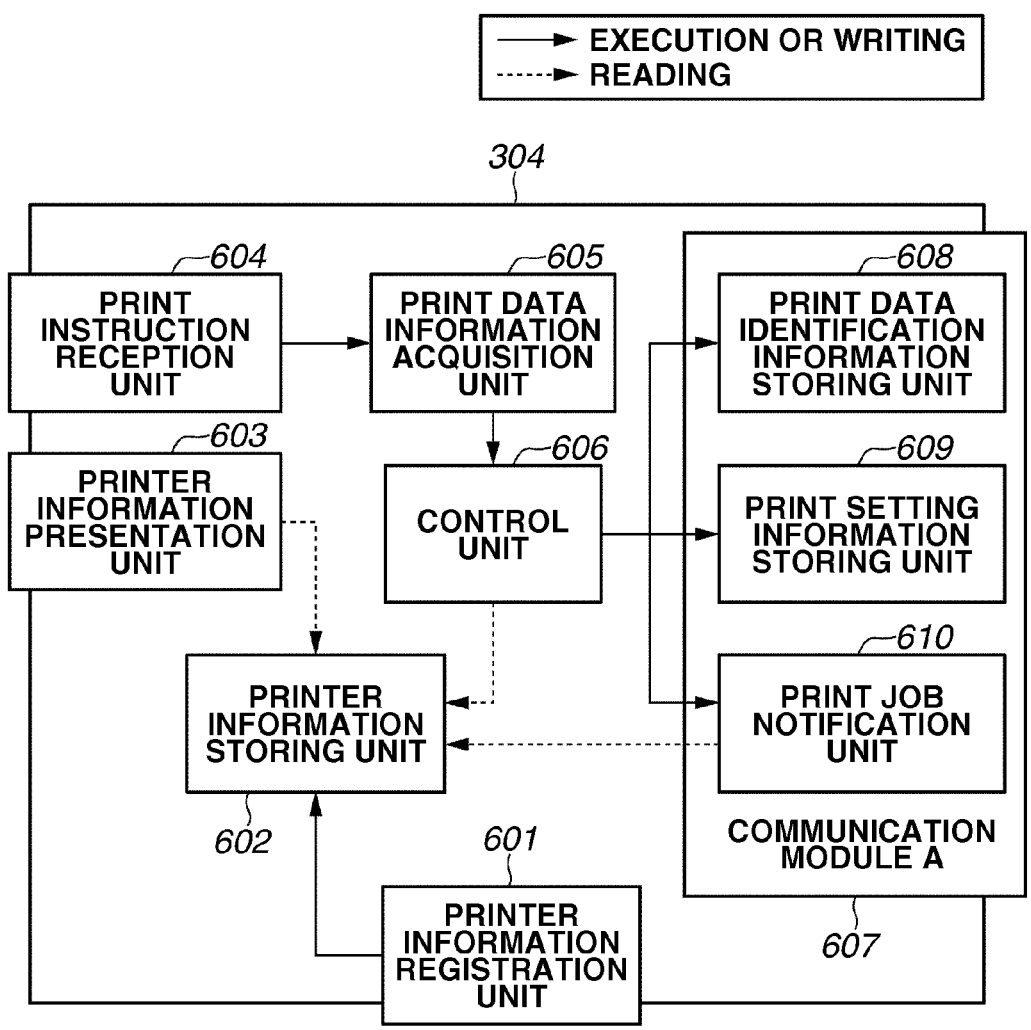
FIG. 6 is a functional block diagram illustrating a print service according to an exemplary embodiment of the claimed invention.

FIG. 6 is a functional block diagram of the print service 304. A printer information registration unit 601 included in the print service 304 can receive user identification information from the print service printer generation unit 504. The printer information registration unit 601 can perform authentication while transmitting an inquiry to the authentication service A 307 of the web application server group 105. If the authentication has been successfully completed, the printer information registration unit 601 can receive user identification information from the authentication service A 307. The user identification information includes a user ID of the print service 304.

The printer information registration unit 601 can receive printer name, capabilities, and VPID from the print service printer generation unit 504, and can instruct a printer information storing unit 602 to store the received information. Further, the printer information registration unit 601 can issue SPID associated with the VPID and can transmit the issued SPID to the printer information storing unit 602 and the print service printer generation unit 504.

The printer information storing unit 602 can store VPID, SPID, printer name, capabilities and print service user ID while associating them with each other. FIG. 8C illustrates information stored in the printer information storing unit 602, which includes fields of print service user ID 812, SPID 813, printer name 814, capabilities 815, and VPID 816. Other functions are described below.

The above-described functions are the functions classified into the registration system, which include registering the image forming apparatus 102 to the print relay server 103, realizing the relay virtual printer 303 in the print relay server 103, and registering the relay virtual printer 303 in the print service 304.

Next, functions classified into the printing system are described in detail below. First, the client computer 106 has the following functions. As illustrated in FIG. 3, the client computer 106 includes the web browser 305. The web browser 305 transmits a print instruction for a content stored in the web application server group 105 to the web application server group 105 via a request transmission unit 701 shown in FIG. 7.

Figure 7:
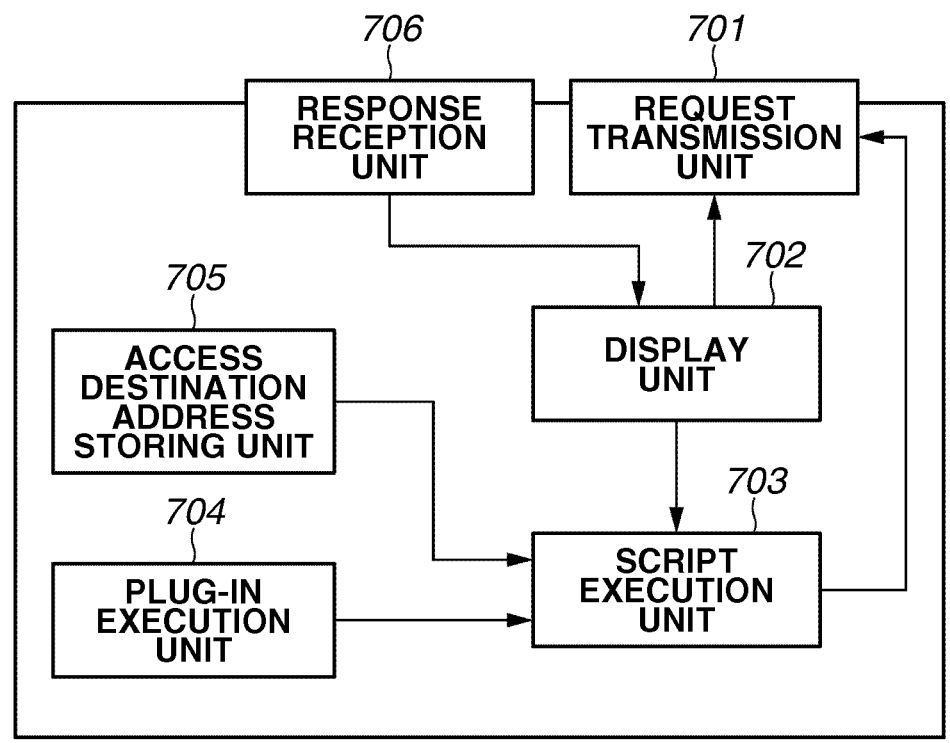
FIG. 7 is a functional block diagram illustrating a web browser according to an exemplary embodiment of the claimed invention.

FIG. 7 is a functional block diagram of the web browser 305 shown in FIG. 3 according to an exemplary embodiment. The web browser 305 includes the request transmission unit 701, a display unit 702, a script execution unit 703, a plug-in execution unit 704, an access destination address storing unit 705, and a response reception unit 706.

Further, the web browser 305 receives a redirect instruction (i.e., an access command directed from the web application server group 105 to the print server group 104) and accesses the print server group 104 according to the received redirect instruction. In this case, the access from the web browser 305 to the web application server group 105, the print server group 104, or the relay virtual printer management service 302 can be performed via the request transmission unit 701.

Further, the web browser 305 acquires a list of image forming apparatuses that are available to perform printing for a user who uses the web browser 305 from the accessed print server group 104. The web browser 305 displays the acquired list information. Further, the web browser 305 acquires a print setting screen that corresponds to an image forming apparatus, if it is selected by the user from the list, from the print server group 104 and displays the acquired print setting screen.

Figure 10B:
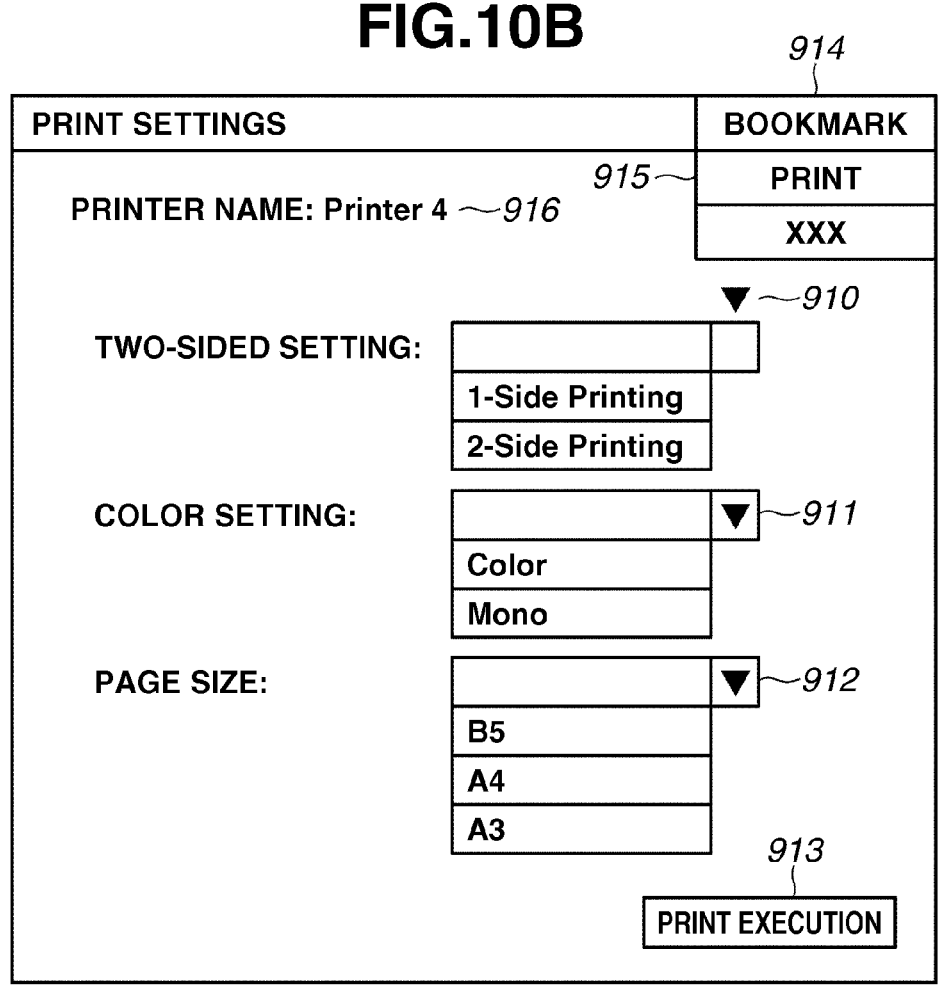

The display unit 702 can display the above-described list of image forming apparatuses and the acquired print setting screen. FIG. 10B illustrates an example of the print setting screen that corresponds to the image forming apparatus selected by the user. Further, the web browser 305 transmits print setting values, if they are set by the user on the print setting screen, to the print server group 104 via the request transmission unit 701.

The access destination address storing unit 705 of the web browser 305 can store an access script (see FIG. 13A) directed to the relay virtual printer management service 302. The display unit 702 of the web browser 305 displays the access script as print 915 of bookmark 914 illustrated in FIG. 10B. If the print 915 is designated through a user operation, a script execution unit 703 executes the access script (see FIG. 13A).

The access script is a print instruction request directed to the relay virtual printer management service 302 and can be received by a print instruction reception unit 508 of the relay virtual printer management service 302. An example operation of the print instruction reception unit 508 is described below. The web browser 305 executes the access script through the execution by the script execution unit 703. Then, the request transmission unit 701 transmits a print instruction request as authentication information of the print server group 104 stored in a cookie (not illustrated), together with authentication token, to the relay virtual printer management service 302 via the request transmission unit 701.

The printing system according to the present exemplary embodiment is configured to use auth token as the authentication token. When the web browser 305 accesses the web application server group 105 or the print server group 104, if the access has been successfully completed by the authentication service A 307, the authentication token of the print server group 104 can be generated by the authentication service A 307. The web application server group 105 or the print server group 104 transmits the authentication token to the web browser 305. The web browser 305 stores the authentication token in the cookie (not illustrated).

The response reception unit 706 can receive a response replying to the print instruction request transmitted from the request transmission unit 701 to the relay virtual printer management service 302. The received response is a retry request directed to the relay virtual printer management service 302 or a print instruction script directed to the image forming apparatus 102. If the received response is the retry request, the display unit 702 displays a processing standby screen (not illustrated).

After a designated time has elapsed, the print instruction request is transmitted to the relay virtual printer management service 302 via the request transmission unit 701. If the received response is the print instruction script directed to the image forming apparatus 102, the script execution unit 703 interprets the print instruction script and transmits a print instruction to the image forming apparatus 102 via the request transmission unit 701. A plug-in execution unit 704 is described in detail below. The web browser 305 included in the client computer 106 has the above-described functions.

Next, functions of the web application server group 105 are described in detail below. The web application server group 105 includes a web application 306. The web application server group 105 is composed of a plurality of servers, which can be regarded as a single virtualized server. The web application server group 105 (i.e., the single virtualized server) can realize the functions of the web application 306. The web application server group 105 includes a plurality of virtual machines, which can be launched in a single server to realize respective functions of the web application 306.

The web application 306 can provide a web service that is related to document generation. For example, if a user wants to distribute conference materials in a company, the user can use a document generation service to generate the materials. When the client computer 106 uses the web application 306, if the client computer 106 has the web browser 305, the client computer 106 does not need to install the application 306. The web application 306 transmits screen information used to generate the materials to the web browser 305.

The web application 306 acquires user identification information including user ID and password input by the user via the web browser 305. The web application 306 transmits the acquired user identification information to the authentication service A 307. The authentication service A 307 performs authentication of the user. If the user authentication has been successfully completed, the authentication service A 307 issues authentication token and sends a notification including the issued authentication token to the web application 306. The authentication service A 307 stores correspondence information between the user ID of the user and the issued authentication token in a storage unit (not illustrated). The web application 306 transmits the screen information used to generate the materials, together with the authentication token, to the web browser 305.

The web browser 305 stores the transmitted authentication token in the cookie. When the web browser 305 receives the screen information, the web browser 305 displays a generation screen that enables each user to generate a document based on the screen information. The user generates conference materials to be distributed using the generation screen. The web application 306 receives information relating to the materials generated by the user using the generation screen and generates a content based on the received information. The web application 306 causes a storage device (not illustrated) of the web application server group 105 to store content data that corresponds to the generated content. In this case, the user inputs the title of the content.

Further, in a case where a plurality of contents is generated and stored, the title of a generated content may coincide with the title of another generated content. In such a case, content identification information is allocated to each content data of respective contents so that each content can be uniquely identified based on the content identification information. The content data can be stored using an appropriate format, such as general word processor document, spreadsheet document, presentation document, Portable Document Format (PDF) format, Hyper Text Markup Language (HTML) format, or the like. The web application 306 can provide a mail service and a schedule service in addition to the above-described document generation service.

Figure 12:
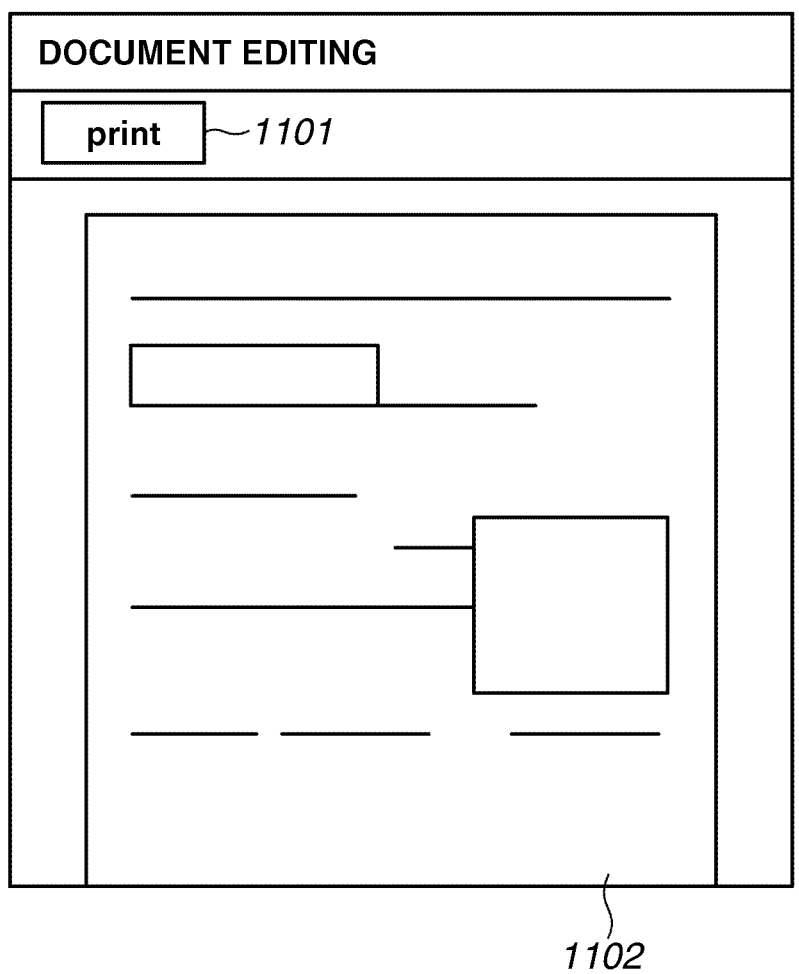
FIG. 12 illustrates an example state where a print button is pressed.

If a user wants to print the content (content 1102) generated using the document generation service, the user presses a print button 1101 displayed on the generation screen, as illustrated in FIG. 12. When the web application 306 receives information notifying that the print button has been pressed, the web application 306 transmits an access command directed to the print server group 104 (more specifically, a redirect instruction) to the web browser 305. In this case, the redirect instruction includes a request for acquisition of a list that corresponds to a user using the above-described web browser 305, content identification information used to identify a print content instructed by the user, and user identification information.

Further, when the web application 306 receives a print data acquisition request from the print server group 104, the web application 306 transmits print data identification information used to identify the print data to the print server group 104. In the present exemplary embodiment, the print data is a content of PDF format. Accordingly, print data identification information is identification information relating to the content of PDF format.

As described above, the web application 306 can provide a mail service and a schedule service in addition to the above-described document generation service. Contents generated using the services provided by the web application 306 are available when a program or a service is provided by a third party via the interface of the web application 306. The web application 306 stores contents of various formats. Therefore, contents of various formats can be acquired via the above-described interface. The web application 306 included in the web application server group 105 has the above-described functions.

Next, functions of the print server group 104 classified into the printing system are described in detail below. As illustrated in FIG. 6, the print service 304 of the print server group 104 includes a printer information presentation unit 603. When the printer information presentation unit 603 receives a list acquisition request from the web browser 305, the printer information presentation unit 603 transmits a list to the web browser 305. The printer information presentation unit 603 identifies SPID and printer name stored in the printer information storing unit 602 based on the user identification information.

Then, the printer information presentation unit 603 generates a list of image forming apparatuses that are available for the user based on the print service identification information (i.e., SPID and printer name). Further, the printer information presentation unit 603 receives SPID of an image forming apparatus selected by the user from the list. The printer information presentation unit 603 identifies capabilities stored in the printer information storing unit 602 based on the received SPID and generates a print setting screen. The printer information presentation unit 603 transmits the generated print setting screen to the web browser 305.

The printer information storing unit 602 generates the print setting screen illustrated in FIG. 10B based on the capabilities information illustrated in FIG. 8C. As illustrated in FIG. 10B, the printer information storing unit 602 generates the print setting screen that allows each user to select print settings described in the capabilities. A print instruction reception unit 604 can receive print settings having been set via the print setting screen and SPID from the web browser 305. Further, in response to the access from the web browser 305 based on a redirect instruction, the print instruction reception unit 604 receives print data identification information used to identify the print data instructed by the user.

A print data information acquisition unit 605 can receive print data from the print instruction reception unit 604. Further, the print data information acquisition unit 605 can receive the print settings having been input by a user and SPID that corresponds to the image forming apparatus 102 having been selected by the user, from the print instruction reception unit 604. A control unit 606 can acquire print data, print settings, and SPID from the print data information acquisition unit 605. The print settings are described using the XML format as illustrated in FIG. 11B.

According to the example illustrated in FIG. 11B, it is understood that the print settings having been input by the user include two-sided setting, monochrome setting, and paper size A4. The communication module A 607 can communicate with an apparatus including the communication module A' 517, and is operable as a data communication interface between two devices. The communication module A' 517 can communicate with the communication module A 607. The reason is described in detail below. The communication module A 607 has the following functions.

The communication module A 607 includes a print data identification information storing unit 608, a print setting storing unit 609, and a print job notification unit 610. The print data identification information storing unit 608 can receive print data identification information from the control unit 606 and can store the received print data identification information. The print setting storing unit 609 can receive print settings from the control unit 606 and can store the received print settings. Each of the print data identification information storing unit 608 and the print setting storing unit 609 can perform processing for receiving a storage instruction from the control unit 606 and storing the received storage instruction.

When the control unit 606 receives a storage completion notice from the print data identification information storing unit 608 or the print setting storing unit 609, the control unit 606 instructs the print job notification unit 610 to transmit notification information to the image forming apparatus 102. When the print job notification unit 610 is instructed by the control unit 606 to transmit the notification information, the print job notification unit 610 acquires SPID from the printer information storing unit 602 via the control unit 606.

Further, the print job notification unit 610 identifies VPID based on information stored in the printer information storing unit 602. In the present exemplary embodiment, transmission destination information that corresponds to the SPID, i.e., the VPID described in the first exemplary embodiment, is referred to as a target. The user can designate VPID by selecting SPID. Further, the print job notification unit 610 acquires print data storage location and print setting storage location from the control unit 606, and generates notification information A. Then, the print job notification unit 610 transmits the notification information A to the registered image forming apparatus 102.

The information transmitted by the print job notification unit 610 corresponds to information relating to the data. The information relating to the data according to the first exemplary embodiment is the notification information A, which may include other information and data depending on a communication method.

In the first exemplary embodiment, the registered image forming apparatus 102 is a relay virtual printer that corresponds to VPID. The notification information A can be expressed using an XML format illustrated in FIG. 11C, in which print data storage location 1701, print setting storage location 1702, and SPID 1703 are described. The notification information A is notification information that can be transmitted by the print service 304 to provide print data to a transmission destination. The notification information A includes common information that is commonly allocated to both the content data and the print data. According to the example illustrated in FIG. 11C, "Doc1" described in the item <title> corresponds to the common information.

The reason why a communication module other than the communication module A' cannot communicate with the communication module A is described below. The communication module other than the communication module A' cannot interpret the notification information A described using the XML format transmitted from the print job notification unit 610. Further, the communication module other than the communication module A' cannot communicate with the communication module A in the following cases.

For example, when the communication module A does not include the print job notification unit 610 and the communication module A' acquires print data and print settings according to another method, the communication module A' that acquires the notification information A cannot perform acquisition. This is because the communication module A' that acquires the notification information A is waiting for the notification information A from the communication module A. Therefore, the print data and the print settings cannot be acquired unless the notification information A is notified.

The communication module A' that can communicate with the communication module A requires a configuration capable of inquiring the communication module A about the presence of any data to be acquired. As described above, when the communication module A' does not conform to the communication module A in data communication standards, the communication module A cannot communicate with the communication module A'. The infrastructure that enables the communication module A and the communication module A' to communicate with each other is referred to as a specification of the vendor that provides the print server group 104. The specifications deeply depend on the vendor that manages the print server group 104.

A vendor that manages the print server group 104 installs the communication module A on the print server group 104. The communication module A' that can communicate with the communication module A is opened to the public. Actually, establishment of such a system is recently promoted. A unique method for enabling the print server group 104 to perform data communications with a device is opened to the public by the vendor that manages the print server group 104. To enable the image forming apparatus 102 to communicate with the print server group 104, the device vendor of the image forming apparatus 102 installs the communication module A' on the image forming apparatus 102.

It is now presumed that the vendor that manages the print server group 104 has changed the configuration of the communication module A. More specifically, it is now presumed that the vendor that manages the print server group 104 has changed the specifications. In this case, the device vendor changes the communication module A' of the image forming apparatus 102 according to the change of the specifications. The load of the above-described work is very high. More specifically, the setup locations of image forming apparatuses range over various client environments. To enable the print server group 104 and the image forming apparatus to restart communicating with each other, a service engineer changes the communication module A' at each of the various client environments.

Further, a method for distributing the communication module A' without using any service engineer may be employable. However, distributing the communication module A' to a plurality of image forming apparatuses will increase the load of a communication band. In this case, the problem can be solved by using the functions classified into the printing system of the print relay server 103. The specifications of data communications, to be opened to the public by the vendor that manages the print server group 104, correspond to first specifications. The interfaces of the communication module A and the communication module A' are interfaces that can be generated in compliance with the first specifications.

Next, functions of the print relay server 103 classified into the printing system are described in detail below. As illustrated in FIG. 5, the relay virtual printer 303 includes the communication module A' 517. A print notification reception unit 512 of the communication module A' 517 can receive the notification information A transmitted from the print job notification unit 610. Registered in the print service 304 is the relay virtual printer 303, not RPID of the image forming apparatus 102. Therefore, the notification information A is transmitted to the print notification reception unit 512. The communication module A' 517 is a module paired with the communication module A. Therefore, the print notification reception unit 512 can interpret the notification information A.

The print notification reception unit 512 confirms the print data storage location and the print setting storage location described in the notification information A. The print notification reception unit 512 sends a notification including the confirmed information to a print setting acquisition unit 511 and a print data acquisition unit 510. Further, the print notification reception unit 512 sends a notification including reception of the print notification and the notified SPID to the user information management unit 505 of the relay virtual printer management service 302.

If the user information management unit 505 receives the print notification, the user information management unit 505 sets "notified" as first print state in status 810 of the same row, which corresponds to the SPID 806 included in printer management information illustrated in FIG. 8B that coincides with the designated SPID. In FIG. 8B, the status 810 represents the print state. The user information management unit 505 manages the print state in association with information including each identification information. Ordinarily, "–" is set in the status 810. When the print notification reception unit 512 receives the print notification, the user information management unit 505 sets "notified" in the status 810.

Further, at the timing when the later-described print data acquisition unit 510 has acquired print data, the print data acquisition unit 510 sends a notification informing the acquisition of the print data together with SPID to the user information management unit 505. If the user information management unit 505 receives the print data acquisition notification from the print data acquisition unit 510, the user information management unit 505 sets "got" as second print state in the status 810 of the designated SPID 806.

More specifically, if the above-described value is "notified", it indicates a state where the print notification has been received from the print service 304. If the above-described value is "got", it indicates a state where the print data has been acquired from the print service 304. Example operations using the above-described values are described below. The print setting acquisition unit 511 acquires print settings from the print setting storing unit 609 based on the notified print setting storage location. The print data acquisition unit 510 acquires print data from the print data identification information storing unit 608 with reference to the notified print data storage location.

The print data acquisition unit 510 transmits the print data and the SPID to a print job generation unit 514. The print setting acquisition unit 511 transmits the print settings to the print job generation unit 514. In this respect, the print job generation unit 514 is functionally operable as a generation unit configured to generate a print job that corresponds to each image forming apparatus based on print data and print settings. Further, the print job generation unit 514 generates job ID that corresponds to the print job (more specifically, job identification information) and transmits the generated job ID to a print job storing unit 515.

The print job generation unit 514 transmits the job ID and the SPID to the user information management unit 505 of the relay virtual printer management service 302. The user information management unit 505 stores the received job identification information as Job ID 811 included in the printer management information illustrated in FIG. 8B. In this case, the Job ID 811 is stored until a print job is acquired from a later-described image forming apparatus.

If the print instruction reception unit 508 receives a print instruction request from the web browser 305, the print instruction reception unit 508 sends a notification including the print instruction request and the authentication token issued by the received authentication service A 307 to the control unit 502. The control unit 502 sends the authentication token to the authentication service B 308, which is linked with the authentication service A 307 through a trust relationship established between them, and causes the authentication service B 308 to perform user authentication processing. The authentication service B 308 performs user authentication processing with reference to the authentication token received from the control unit 502.

More specifically, the authentication service B 308 accesses the authentication service A 307 and determines whether the authentication service A 370 stores authentication token that coincides with the authentication token received from the control unit 502. If the authentication service B 308 determines that the authentication service A 370 stores the authentication token that coincides with the authentication token received from the control unit 502, the authentication service B 308 determines that the user authentication has been successfully completed. When the user authentication has been successfully completed, the authentication service B 308 acquires user ID associated with the coincident authentication token from the authentication service A 307 and sends the acquired user ID to the control unit 502. The control unit 502 receives the user ID from the authentication service B 308. Thus, the control unit 502 can identify a user who is associated with the authentication token included in the print instruction request.

The control unit 502 acquires the status 810 associated with "print relay service User ID" 801 that is the same as the user ID received from the authentication service B 308, with reference to the printer management information illustrated in FIG. 8B. If only "–" is present in the acquired status 810 (i.e., the state illustrated in FIG. 9A1), the control unit 502 acquires the status 810 after a predetermined time A has elapsed and confirms the status 810. Further, if only "–" is present after a predetermined time B has elapsed (state illustrated in FIG. 9A1), a response generation unit 507 generates an error response in accordance with an instruction from the control unit 502. The control unit 502 transmits an error response to the web browser 305. In the present exemplary embodiment, the predetermined time A and the predetermined time B are system setting values held beforehand by the relay virtual printer management service 302.

In a case where "notified" is present in the status 810 (i.e., the state illustrated in FIG. 9A2), the control unit 502 causes the response generation unit 507 to generate a retry request and transmits a response including the retry request to the web browser 305. Further, in a case where there is not any job ID in the Job ID 811 although "got" is present in the status 810 (i.e., the state illustrated in FIG. 9A3), the control unit 502 causes the response generation unit 507 to generate a retry request and transmits a response including the generated retry request to the web browser 305.

If "got" is present in the status 810 and job ID is present in the Job ID 811 (i.e., the state illustrated in FIG. 9A4), the control unit 502 causes the response generation unit 507 to generate a print instruction script (not illustrated) directed to the image forming apparatus based on IP address 809 illustrated in FIG. 8A. More specifically, the control unit 502 is functionally operable as a confirmation unit configured to confirm the status 810 and check whether a print job has been generated based on print information.

The control unit 502 returns a response including the print instruction script to the web browser 305. In the present exemplary embodiment, the print instruction script can be transmitted, by redirect, from the web browser 305 to the image forming apparatus 102. The print instruction script directed to the image forming apparatus 102 includes authentication token, VPID 802, Job ID 811, and job acquisition destination Uniform Resource Locator (URL). The job acquisition destination URL is access URL directed to the relay virtual printer management service 302. More specifically, the control unit 502 is functionally operable as a transmission unit configured to transmit print job location information via the web browser 305 in response to the confirmation of a generated print job. The values of the status 810 and Job ID

811 are initialized (more specifically, reset to "–") when the later-described image forming apparatus 102 completes the acquisition of the print job.

A print job acquisition request, which can be transmitted from the image forming apparatus 102 to the print relay server 103, includes authentication token acquired from the web browser 305, VPID, and job ID. If a print job transmission unit 509 receives the print job acquisition request from the image forming apparatus 102, the authentication service B 308 performs authentication based on the authentication token. Then, if the authentication has been successfully completed, the print job transmission unit 509 identifies the relay virtual printer 303 with reference to the VPID 802 and acquires a print job that coincides with the job ID from the print job storing unit 515 of the identified relay virtual printer 303. The print job transmission unit 509 transmits the acquired print job to the image forming apparatus 102.

Figure 4:
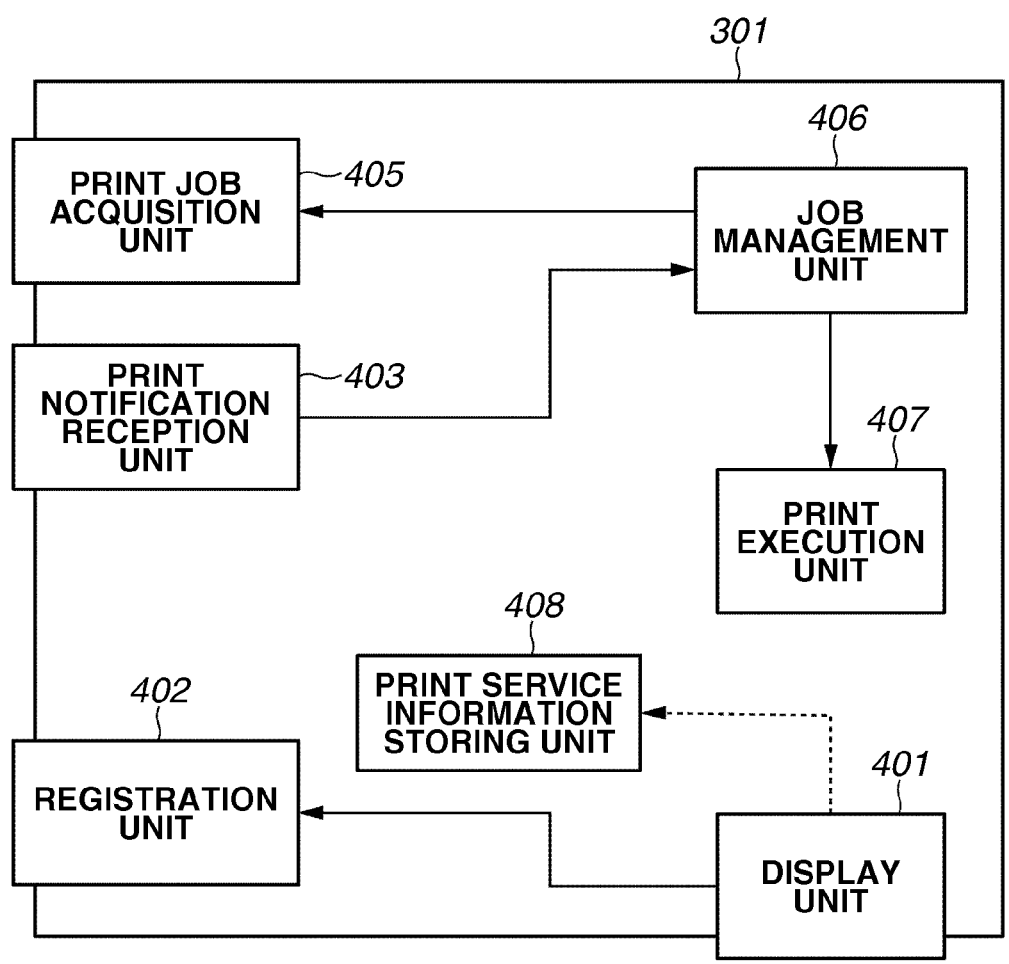
FIG. 4 is a functional block diagram illustrating print control software according to an exemplary embodiment of the claimed invention.

Functions of the image forming apparatus 102 classified into the printing system are described in detail below with reference to FIG. 4. The print control software 301 illustrated in FIG. 4 includes a print notification reception unit 403 configured to receive a print instruction transmitted from the script execution unit 703 of the web browser 305 illustrated in FIGS. 3 and 7. The print instruction information transmitted from the script execution unit 703 includes authentication token, VPID, job ID, and job acquisition destination URL.

The print notification reception unit 403 sends the print instruction information to a job management unit 406. The job management unit 406 stacks the job on a print queue. The job management unit 406 acquires a print job to be processed at present time via a print job acquisition unit 405. The print job acquisition unit 405 transmits a print job acquisition request to the relay virtual printer management service 302 with reference to the job acquisition destination URL. In this case, the print job acquisition request includes authentication token, VPID, and job ID.

The print job acquisition unit 405 transmits the print job acquired from the print job transmission unit 509 to the job management unit 406. The job management unit 406 instructs a print execution unit 407 to perform printing. If the print execution unit 407 receives the instruction, the print execution unit 407 generates a raster image based on the print data included in the print job and instructs a printing unit (not illustrated) to print the generated raster image. As described above, the printing system transmits a print instruction of a content generated by the web application server group 105 to the print server group 104 and causes the image forming apparatus to perform printing based on print data transmitted from the print server group 104.

Next, example processing including registering the image forming apparatus 102 to the print relay server 103, realizing the relay virtual printer 303 in the print relay server 103, and registering the relay virtual printer 303 in the print service 304 is described in detail below with reference to FIG. 14. First, in step S1301, a user selects a print service to be registered via the UI of the image forming apparatus 102 and inputs user ID and password.

In step S1302, the registration unit 402 of the print control software 301 in the image forming apparatus 102 requests the request reception unit 501 of the relay virtual printer management service 302 to perform printer registration. In this case, the registration unit 402 transmits the above-described registration information to the virtual printer generation unit 503 of the relay virtual printer management service 302.

In step S1303, the virtual printer generation unit 503 realizes the relay virtual printer 303 based on the registration information. In step S1304, the virtual printer generation unit 503 generates VPID if the generation of the relay virtual printer 303 has been successfully completed. In step S1305, the print service printer generation unit 504 of the relay virtual printer management service 302 transmits user ID and password to the print service 304, and requests the print service 304 to perform authentication. The print service 304 (i.e., the authentication service A 307) performs authentication via the authentication service B 308. If the authentication has been successfully completed, then in step S1306, the print service 304 sends a response notifying successful completion of the authentication to the relay virtual printer management service 302.

In step S1307, the relay virtual printer management service 302 requests the print service 304 to register VPID as a service printer (i.e., a printer that can be provided to the user). In step S1308, the print service 304 registers the VPID as a service printer and transmits a response including SPID issued to inform successful generation to the print service printer generation unit 504. The control unit 502 receives the SPID from the print service printer generation unit 504 and instructs the user information management unit 505 to store the received SPID. In this case, the user information management unit 505 updates the print service information.

In step S1309, the control unit 502 sends a notification informing completed registration of the image forming apparatus 102 to the print relay server 103 and the registration of the relay virtual printer 303 to the print service 304 to the relay virtual printer 303. In step S1310, the communication module A' 517 of the relay virtual printer 303 communicates with the communication module A 607 of the print service 304 based on the SPID and waits for transmission of the notification information A.

In step S1311, the relay virtual printer management service 302 sends a notification informing completion of the printer registration to the print control software 301. In step S1312, the display unit 401 of the print control software 301 displays a message informing completed registration of the image forming apparatus on the UI of the image forming apparatus 102. Registration processing can be accomplished as described above.

Figure 15:
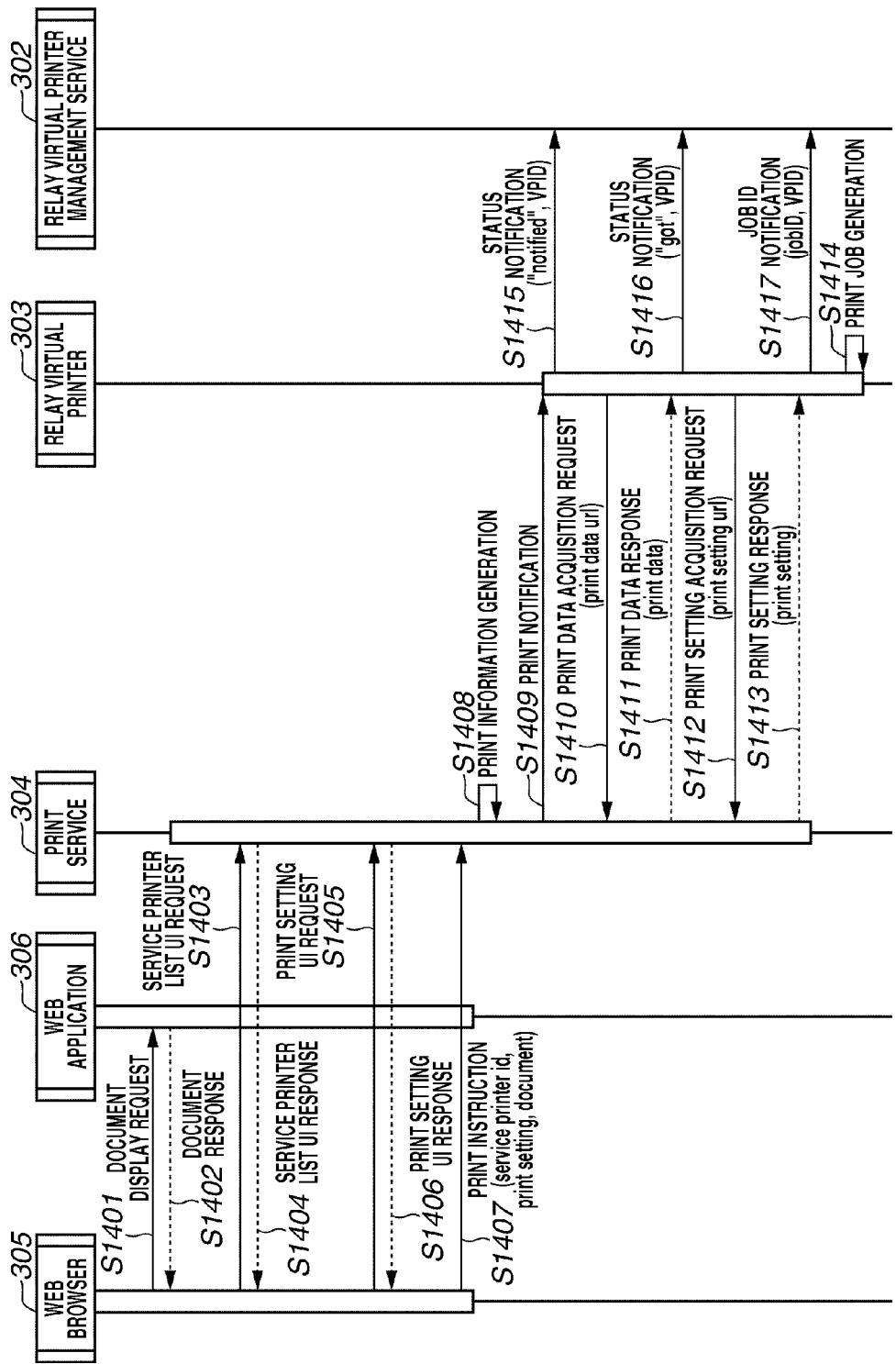
FIG. 15 is a sequence diagram illustrating the former part of example processing for causing an image forming apparatus to perform printing according to a print instruction from the web browser.

Next, example processing is described in detail below with reference to FIGS. 15 and 16, in which the web browser 305 transmits a print instruction to the print server group 104 and the image forming apparatus 102 performs print processing based on print data transmitted from the print server group 104. First, in step S1401, the web browser 305 requests the web application 306 to display content data that a user wants to perform editing. In step S1402, the web application 306 transmits a response including a content data screen that corresponds to the requested content to the web browser 305.

In step S1403, in response to a user's print instruction input via the content screen, the web browser 305 requests an image forming apparatus (service printer) list screen registered in the printer information storing unit 602 of the print service 304. In step S1404, the printer information presentation unit 603 generates a service printer list screen that corresponds to a user who is operating the web browser 305 based on the printer information stored in the printer information storing unit 602. Then, the printer information presentation unit 603 transmits the generated service printer list screen to the web browser 305.

In step S1405, in response to a user's selection of an image forming apparatus from the list screen, the request transmission unit 701 requests the print service 304 to transmit a print setting screen that corresponds to the selected image forming apparatus. In step S1406, the printer information presentation unit 603 receives SPID of the image forming apparatus selected by the user from the list. The printer information presentation unit 603 identifies capabilities of the image forming apparatus stored in the printer information storing unit 602 based on the received SPID, and generates a requested print setting screen. The printer information presentation unit 603 transmits a response including the generated print setting screen to the web browser 305.

In step S1407, the web browser 305 transmits a print instruction including print settings input by the user via the print setting screen to the print instruction reception unit 604 of the print service 304. In step S1408, the print data information acquisition unit 605 acquires print data corresponding to the user's print instruction from the print instruction reception unit 604. Further, the control unit 606 of the print service 304 receives the print data and the print settings from the print instruction reception unit 604 and combines the received data as print information.

In step S1409, the print job notification unit 610 sends a notification informing complete generation of the print information to the print notification reception unit 512 of the relay virtual printer 303. In step S1415, the print notification reception unit 512 sends a notification including status ("notified") to the user information management unit 505 of the relay virtual printer management service 302. Next, in step S1410, the print data acquisition unit 510 sends a print data acquisition request to the print data identification information storing unit 608 according to the print notification received in step S1409.

In step S1411, the print data identification information storing unit 608 transmits print data, as a response replying to the print data acquisition request, to the print data acquisition unit 510. Further, in step S1416, the print notification reception unit 512 sends a notification including status ("got") to the user information management unit 505. In step S1412, the print setting acquisition unit 511 transmits a print setting acquisition request to the print setting storing unit 609. In step S1413, the print setting storing unit 609 transmits a response including print settings to the print setting acquisition unit 511.

In step S1414, the print job generation unit 514 starts generating a print job. In step S1417, the print job generation unit 514 sends a notification including a job ID of the generation started print job to the user information management unit 505 of the relay virtual printer management service 302.

Processing to be performed in step S1417 and subsequent steps is described in detail below with reference to FIG. 16. In step S1421, the user operates the print 915 of the bookmark illustrated in FIG. 10B. In response to the user's operation, the request transmission unit 701 of the web browser 305 transmits a print request including access script and auth token to the print instruction reception unit 508 of the relay virtual printer management service 302. In the present exemplary embodiment, the auth token is authentication token that can be issued by the authentication service A.

In step S1422, the control unit 502 of the relay virtual printer management service 302 causes the authentication service B 308 to perform user authentication processing based on the authentication token, i.e., the auth token. If the user authentication has been successfully completed, the control unit 502 receives user ID associated with the auth token from the authentication service B 308. The control unit 502 acquires "print relay service User ID" 801 that is the same as the received user ID with reference to the printer management information illustrated in FIG. 8B.

Subsequently, the control unit 502 performs the following confirmation processing with reference to the status 810 associated with the acquired "print relay service User ID" 801. More specifically, the control unit 502 checks if the print notification has been received from the print service 304, if the acquisition of the print settings and the print data from the print service 304 has been completed, or if the job ID has been registered, with reference to the printer management information illustrated in FIG. 8B. If it is determined that the printer management information does not include any registered job ID, the control unit 502 transmits a response including a retry request for re-transmission of a print instruction to the response reception unit 706 of the web browser 305.

In step S1423, if a predetermined time (e.g., predetermined time A) has elapsed, the request transmission unit 701 transmits a print request including the access script and the auth token issued by the authentication service A. In step S1424, the control unit 502 performs confirmation processing with reference to the printer management information illustrated in FIG. 8B, which is stored in the user information management unit 505. If print job generation is started in step S1414 illustrated in FIG. 15 and job ID registration is completed, then in step S1426, the response generation unit 507 of the relay virtual printer management service 302 generates a print instruction script.

The control unit 502 transmits the print instruction script generated by the response generation unit 507 to the response reception unit 706. The print instruction script includes URL of a print data acquisition destination (i.e., print relay server), job ID, auth token, and connection destination information (including IP address of the image forming apparatus), and VPID. The auth token is authentication information used if the relay virtual printer management service 302 performs authentication, when the image forming apparatus acquires a print job. Further, the IP address of the image forming apparatus is IP address of an image forming apparatus associated with the service printer that has generated the print information. Similarly, the VPID is VPID of the relay virtual printer 303 associated with the service printer that has generated the print information.

In step S1427, the user designates a print execution button 913 illustrated in FIG. 10B. In accordance with the designation, the web browser 305 transmits a print instruction to the print control software 301 based on the connection destination information (including IP address of the image forming apparatus) included in the print instruction script. The print instruction includes URL of a print job acquisition destination (i.e., the print relay server 103), job ID, auth token, and VPID.

In step S1428, the print job acquisition unit 405 of the print control software 301 transmits a print job acquisition request to the print job transmission unit 509 of the relay virtual printer management service 302 based on the URL of the print job acquisition destination (i.e., the print relay server 103).

More specifically, the print job transmission unit 509 is functionally operable as a request reception unit configured to receive a job acquisition request from the print control software 301 that executes a print job according to the print instruction of the web browser 305. In this case, the job acquisition request includes job ID, auth token, and VPID. The relay virtual printer management service 302 identifies the relay virtual printer 303 based on the VPID received from the print control software 301.

In step S1429, the print job transmission unit 509 acquires a print job from the print job storing unit 515 of the identified relay virtual printer 303. In step S1430, the print job transmission unit 509 transmits the print job to the print job acquisition unit 405.

In step S1431, the print job acquisition unit 405 transmits the print job acquired from the print job transmission unit 509 to the job management unit 406. The job management unit 406 instructs the print execution unit 407 to perform printing. When the print execution unit 407 receives the instruction, the print execution unit 407 causes the printing unit to print a raster image based on print data included in the print job.

In the process of instructing the image forming apparatus to perform printing based on print data acquired from a vendor server that provides the print service, the infrastructure realizing a push-type printing method, not a polling technique that intends to execute processing across a firewall, can reduce the load of the server. Further, the vendor server generates a print instruction for each user and sends the print instruction to the image forming apparatus via the user. Therefore, it is unnecessary to send user information and print data from the user apparatus to the image forming apparatus. Further, a printing system that enables a plurality of users to commonly use the same image forming apparatus can be realized.

The infrastructure capable of transmitting a print instruction to the image forming apparatus 102 via the web browser 305 can be constructed through the above-described processing. The constructed infrastructure can reduce the load of the request directed to the print relay server 103. Further, a printing system that enables a plurality of users to commonly use a single image forming apparatus can be realized.

In the first exemplary embodiment, the user presses the print 915 of the bookmark illustrated in FIG. 10B and, if the print is executable, the user operates the print execution button 913.

In a second exemplary embodiment, two methods capable of improving the usability when the web browser 305 transmits a print instruction to the relay virtual printer management service 302 are described in detail below. More specifically, the user can send a print instruction to the print service 304 by operating only the print execution button 913. It is unnecessary to output the print instruction to the relay virtual printer management service 302.

The first method is characterized by using a plug-in module beforehand in the web browser 305. The plug-in module is a program that can be executed by the plug-in execution unit 704, which is functionally operable as a plug-in execution unit. The program recognizes and reads the print setting screen illustrated in FIG. 10B, generated by the print server group 104, and monitors an event of the print execution button 913. If the plug-in module detects an event (e.g., button press or mouse down) of the print execution button 913 caused by the user, the plug-in module transmits a print instruction to the relay virtual print management service 302.

In this case, information sent by the print instruction is similar to the information described in the first exemplary embodiment. When the plug-in module is used, the user can operate the print execution button 913 illustrated in FIG. 10B. Thus, the print instruction directed to the print server group 104 and the print instruction directed to the relay virtual print management service 302 can be accomplished by a single operation. More specifically, the web browser 305 is functionally operable as a print instruction unit configured to instruct the print service 304 to perform printing according to a user operation and send the print instruction to the relay virtual print management service 302. To realize the above-described method, the plug-in module of the web browser 305 is installed on the client computer 106 beforehand.

The second method is characterized by customizing the print setting screen that can be generated by the print server group 104. The print server group 104 can change display information to be displayed in screen portions 910, 911, 912, and 913 of the print setting screen illustrated in FIG. 10B. Further, the print server group 104 can realize additional processing with respect to the button operation. The screen illustrated in FIG. 10B can be changed to a screen customization screen illustrated in FIG. 13B.

The screen customization screen illustrated in FIG. 13B is a UI that enables users to perform display/non-display switching at a screen portion 1201, change displayed characters at a screen portion 1202, and perform additional processing relating to the screen button action at a screen portion 1203. Though the UI illustrated in FIG. 13B, users can designate the URL of the relay virtual printer management service 302 to be redirected when a button event occurs and can designate a script that can be executed by the web browser 305.

More specifically, the web browser 305 transmits a print instruction, which includes a redirect instruction that redirects the print instruction to the relay virtual printer management service 302, to the print service 304. The execution timing of the above-described additional processing is later than the print instruction directed to the print server group 104.

When a user presses an execution button 1204 to execute the additional processing, changed information can be transmitted to the print server group 104. The print server group 104 stores the received information for each user. Through the button action for the additional processing, the access URL of the relay virtual printer management service 302 can be registered. Thus, a print instruction directed to the print server group 104 and a print instruction directed to the relay virtual printer management service 302 can be simultaneously processed by operating the print execution button 913. Further, the usability can be improved because installation of the plug-in program is not necessary.

A user may want to print a content list including a plurality of contents using the web application 105. An example method described in a third exemplary embodiment includes transmitting a print instruction of a plurality of contents from the web browser 305 to the relay virtual printer management service 302.

Similar to the second exemplary embodiment, there are two methods. The first method is characterized by using a plug-in module beforehand in the web browser 305. The second method is characterized by customizing the print setting screen illustrated in FIG. 10B that can be generated by the print server group 104.

The first method includes recognizing and reading the content list generated by the web application 105 using the plug-in module, and reading the number of user's selected contents from the screen content. Further, the first method includes recognizing and reading the print setting screen illustrated in FIG. 10B that can be generated by the print server group 104 and detecting an operation event of the print execution button 913. More specifically, the plug-in module detects the number of contents selected when a print instruction is sent to the print service 304 and reads a printer name (see 916).

The plug-in module transmits a print instruction request including the number of contents and the printer name to the relay virtual print management service 302. The relay virtual print management service 302 manages jobs that correspond to the number of received contents. For example, Job IDs 811 to 811' illustrated in FIG. 9B represent a plurality of jobs to be managed. The relay virtual print management service 302 generates a print instruction script in step S1426 upon completing the acquisition of Job IDs 811 to 811' that correspond to the number of contents acquired from the web browser 305.

The second method includes defining variables in the additional processing relating to the button action on the screen customization screen illustrated in FIG. 13B. FIG. 13C illustrates {CONTENTS_NUM} (i.e., the number of contents to be printed) and {SPID} (i.e., SPID of a printer that performs printing) in a field 1205, as variables defined according to the second method. The mapping information according to the above-described definition can be registered by the web application 105 or the print server group 104, when the print screen is generated. If a user operates the print execution button 913 on the print screen, the web browser 305 transmits a print instruction to the print service 304.

The print instruction includes a redirect instruction to be sent to the relay virtual print management service 302. Therefore, the number of contents to be printed and SPID of a printer that performs printing are transmitted, by redirect, to the relay virtual print management service 302. The relay virtual print management service 302 generates all print jobs that correspond to the number of contents transmitted by the redirect. Then, if a print job is generated, information including location information of the print job is transmitted via the web browser 305 to the image forming apparatus that executes the generated print job. Thus, simultaneously instructing the print of a plurality of content can be realized.

Further, executing the following processing realizes the claimed invention. More specifically, the processing includes supplying software (computer program) capable of realizing the functions of the above-described exemplary embodiments to a system or an apparatus via a network or an appropriate storage medium. The processing further includes causing a computer (or a CPU, a micro-processing unit (MPU), and/or the like) of the system or the apparatus to read and execute the program. In this case, the program and a storage medium storing the program can constitute the claimed invention.

Aspects of the claimed invention can also be realized by a computer of a system or apparatus (or devices such as a CPU, an MPU, and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the claimed invention has been described with reference to exemplary embodiments, it is to be understood that the claimed invention is not limited to the disclosed exemplary embodiments. The scope of the following claims is to be accorded the broadest interpretation so as to encompass all modifications, equivalent structures, and functions.

This application claims priority from Japanese Patent Application No. 2011-210396 filed Sep. 27, 2011, which is hereby incorporated by reference herein in its entirety.

What is claimed is:

1. A print relay system configured to communicate, via a network, with a user apparatus, a print service configured to generate print information including print data and print settings according to a print instruction from the user apparatus, and an image forming apparatus configured to execute a print job according to the print instruction, the print relay system comprising:
a management unit configured to store, in a storage unit, and manage printer management information, in which the user apparatus operated by a user, first printer information corresponding to the image forming apparatus that executes a print job according to a print instruction from the user apparatus managed by the print relay system, and second printer information corresponding to the image forming apparatus managed by the print service are associated with one another;
a reception unit configured to receive the print information from the print service;
a generation unit configured to generate a print job based on the print data and the print settings included in the received print information;
a confirmation unit configured to check, in response to reception of the print instruction from the user apparatus, whether print information associated with the second printer information that corresponds to the user who operates the user apparatus, of the second printer information included in the printer management information, has been received from the print service, or whether a print job has been generated based on the print information; and
a transmission unit configured to transmit, in response to the confirmation unit confirming that the print job has been generated based on the print information associated with the second printer information that corresponds to the user, information including location information of the print job via the user apparatus to the image forming apparatus that executes the generated print job,
wherein the management unit is configured to:
set a first print state that corresponds to the second printer information as the printer management information, when the print service sends a notification informing the reception unit of completed generation of the print information that corresponds to the second printer information;
set a second print state that corresponds to the second printer information as the printer management information, when the reception unit, notified of the completed generation of the print information, has acquired print data that corresponds to the second printer information from the print service; and
set identification information of the print job as the printer management information, when the reception unit, having acquired the print data that corresponds to the second printer information, receives print settings that correspond to the print data from the print service and the generation unit has generated a print job based on the print data and the print settings,
wherein the confirmation unit is configured to execute confirmation processing for determining whether the printer management information includes settings relating to the first print state, the second print state, or the print job identification information and, if the confirmation unit determines that the printer management information includes the settings relating to the first print state, the second print state, and the print job identification information, and
wherein the transmission unit is configured to transmit a command to the user apparatus to instruct sending information including print job location information indicated by the identification information to the image forming apparatus that executes the print job.

2. The print relay system according to claim 1, wherein the confirmation unit is configured to execute the confirmation processing at predetermined time intervals, and to transmit, to the user apparatus, a notification prompting re-execution of the print instruction if the printer management information does not include the identification information of the print job while the printer management information includes the first print state or the first print state and the second print state.

3. The print relay system according to claim 1, further comprising:
a request reception unit configured to receive a print job acquisition request from the image forming apparatus that executes the print job according to the print instruction from the user apparatus,
wherein the confirmation unit is configured to:
receive, from the user apparatus, the print instruction including authentication information that is used in authentication processing for the user who operates the user apparatus, which is executed when the request reception unit receives the print job acquisition request; and
identify the user who is associated with the authentication information included in the print instruction, and confirm whether the print information associated with the second printer information that corresponds to the identified user has been received from the print service or whether the print job has been generated based on the print information, with reference to the printer management information.

4. A control method for a print relay system configured to communicate, via a network, with a user apparatus, a print service configured to generate print information including print data and print settings according to a print instruction from the user apparatus, and an image forming apparatus configured to execute a print job according to the print instruction, the control method comprising:
causing a management apparatus included in the print relay system to store, in a storage unit, and manage printer management information, in which the user apparatus operated by a user, first printer information corresponding to the image forming apparatus that executes a print job according to a print instruction from the user apparatus managed by the print relay system, and second printer information corresponding to the image forming apparatus managed by the print service are associated with one another;
receiving the print information from the print service;
generating a print job based on the print data and the print settings included in the received print information;
checking, in response to reception of the print instruction from the user apparatus, whether print information associated with the second printer information that corresponds to the user who operates the user apparatus, of the second printer information included in the printer management information, has been received from the print service, or whether a print job has been generated based on the print information;
transmitting, in response to confirming that the print job has been generated based on the print information associated with the second printer information that corresponds to the user, information including location information of the print job via the user apparatus to the image forming apparatus that executes the generated print jobset a first print state that corresponds to the second printer information as the printer management information, when the print service sends a notification informing the reception unit of completed generation of the print information that corresponds to the second printer information;
causing the management apparatus to set a first print state that corresponds to the second printer information as the printer management information, when the print service sends a notification informing of completed generation of the print information that corresponds to the second printer information;
causing the management apparatus to set a second print state that corresponds to the second printer information as the printer management information, when the print relay system, notified of the completed generation of the print information, has acquired print data that corresponds to the second printer information from the print service;
causing the management apparatus to set identification information of the print job as the printer management information, when the print relay system, having acquired the print data that corresponds to the second printer information, receives print settings that correspond to the print data from the print service and the print job based on the print data and the print settings has been generated;
executing confirmation processing for determining whether the printer management information includes settings relating to the first print state, the second print state, or the print job identification information and, if the printer management information is determined to include the settings relating to the first print state, the second print state, and the print job identification information; and
transmitting a command to the user apparatus to instruct sending information including print job location information indicated by the identification information to the image forming apparatus that executes the print job.

5. A non-transitory computer-readable storage medium storing a computer program that causes a computer to perform a control method for a print relay system configured to communicate, via a network, with a user apparatus, a print service configured to generate print information including print data and print settings according to a print instruction from the user apparatus, and an image forming apparatus configured to execute a print job according to the print instruction, the control method comprising:
causing a management apparatus included in the print relay system to store, in a storage unit, and manage printer management information, in which the user apparatus operated by a user, first printer information corresponding to the image forming apparatus that executes a print job according to a print instruction from the user apparatus managed by the print relay system, and second printer information corresponding to the image forming apparatus managed by the print service are associated with one another;
receiving the print information from the print service;
generating a print job based on the print data and the print settings included in the received print information;
checking, in response to reception of the print instruction from the user apparatus, whether print information associated with the second printer information that corresponds to the user who operates the user apparatus, of the second printer information included in the printer management information, has been received from the print service, or whether a print job has been generated based on the print information;
transmitting, in response to confirming that the print job has been generated based on the print information associated with the second printer information that corresponds to the user, information including location information of the print job via the user apparatus to the image forming apparatus that executes the generated print jobset a first print state that corresponds to the second printer information as the printer management information, when the print service sends a notification informing the reception unit of completed generation of the print information that corresponds to the second printer information;

causing the management apparatus to set a first print state that corresponds to the second printer information as the printer management information, when the print service sends a notification informing of completed generation of the print information that corresponds to the second printer information;

causing the management apparatus to set a second print state that corresponds to the second printer information as the printer management information, when the print relay system, notified of the completed generation of the print information, has acquired print data that corresponds to the second printer information from the print service;

causing the management apparatus to set identification information of the print job as the printer management information, when the print relay system, having acquired the print data that corresponds to the second printer information, receives print settings that correspond to the print data from the print service and the print job based on the print data and the print settings has been generated;

executing confirmation processing for determining whether the printer management information includes settings relating to the first print state, the second print state, or the print job identification information and, if the printer management information is determined to include the settings relating to the first print state, the second print state, and the print job identification information; and transmitting a command to the user apparatus to instruct sending information including print job location information indicated by the identification information to the image forming apparatus that executes the print job.

* * * * *